(12) United States Patent
Yagi

(10) Patent No.: US 11,899,690 B2
(45) Date of Patent: Feb. 13, 2024

(54) DATA ANALYTICAL PROCESSING APPARATUS, DATA ANALYTICAL PROCESSING METHOD, AND DATA ANALYTICAL PROCESSING PROGRAM

(71) Applicant: NIPPON TELEGRAPH AND TELEPHONE CORPORATION, Tokyo (JP)

(72) Inventor: Satoru Yagi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 153 days.

(21) Appl. No.: 17/637,748

(22) PCT Filed: Sep. 2, 2019

(86) PCT No.: PCT/JP2019/034475
§ 371 (c)(1),
(2) Date: Feb. 23, 2022

(87) PCT Pub. No.: WO2021/044497
PCT Pub. Date: Mar. 11, 2021

(65) Prior Publication Data
US 2022/0284043 A1 Sep. 8, 2022

(51) Int. Cl.
*G06F 16/28* (2019.01)
*G06F 16/25* (2019.01)

(52) U.S. Cl.
CPC .......... *G06F 16/283* (2019.01); *G06F 16/254* (2019.01)

(58) Field of Classification Search
CPC .................................................. G06F 16/283
(Continued)

(56) References Cited

U.S. PATENT DOCUMENTS

| | | | | |
|---|---|---|---|---|
| 7,711,704 B2* | 5/2010 | Azizi | ..................... | G06F 16/283 707/600 |
| 2008/0208862 A1* | 8/2008 | Winter | ................ | G06F 16/2343 |
| 2013/0339291 A1* | 12/2013 | Hasner | .................. | G06F 16/283 707/601 |

OTHER PUBLICATIONS

Sonia Rivest et al., Toward better support for spatial decision making: Defining the characteristics of spatial on-line analytical processing (SOLAP), Geomatica, vol. 55, No. 4, 2001, pp. 539-555.

(Continued)

*Primary Examiner* — Muluemebet Gurmu
(74) *Attorney, Agent, or Firm* — Harness, Dickey & Pierce, P.L.C.

(57) ABSTRACT

This invention makes it possible to analyze data with a focus on an event as a source of information on the data and state transition of the event. A data analytical processing device includes a multidimensional database management unit that associates pieces of data in a temporal dimension and spatial dimensions embodying temporal and spatial changes due to at least one of creation and annihilation and state transition and pieces of data in intrinsic dimensions of a plurality of types dependent on subjects, and pieces of data which are identified by the pieces of data in the temporal dimension, the spatial dimensions, and the intrinsic dimensions and represent properties of the plurality of types dependent on the subjects as data embodying an event in a real world with an identifier of the event for identification of the event as a source of information on the pieces of data, and accumulates and manages the pieces of data in multidimensional cubes which are constructed for the respective subjects, and an OLAP manipulation execution unit that executes the OLAP manipulation on the multidimensional cubes.

17 Claims, 17 Drawing Sheets

(58) Field of Classification Search
USPC .......................................................... 707/602
See application file for complete search history.

(56) References Cited

OTHER PUBLICATIONS

Ralph Kimball, Data warehousing tool kit, practical method of building multidimensional data warehousing, Nikkei Business Publications, Inc. May 15, 1998.

* cited by examiner

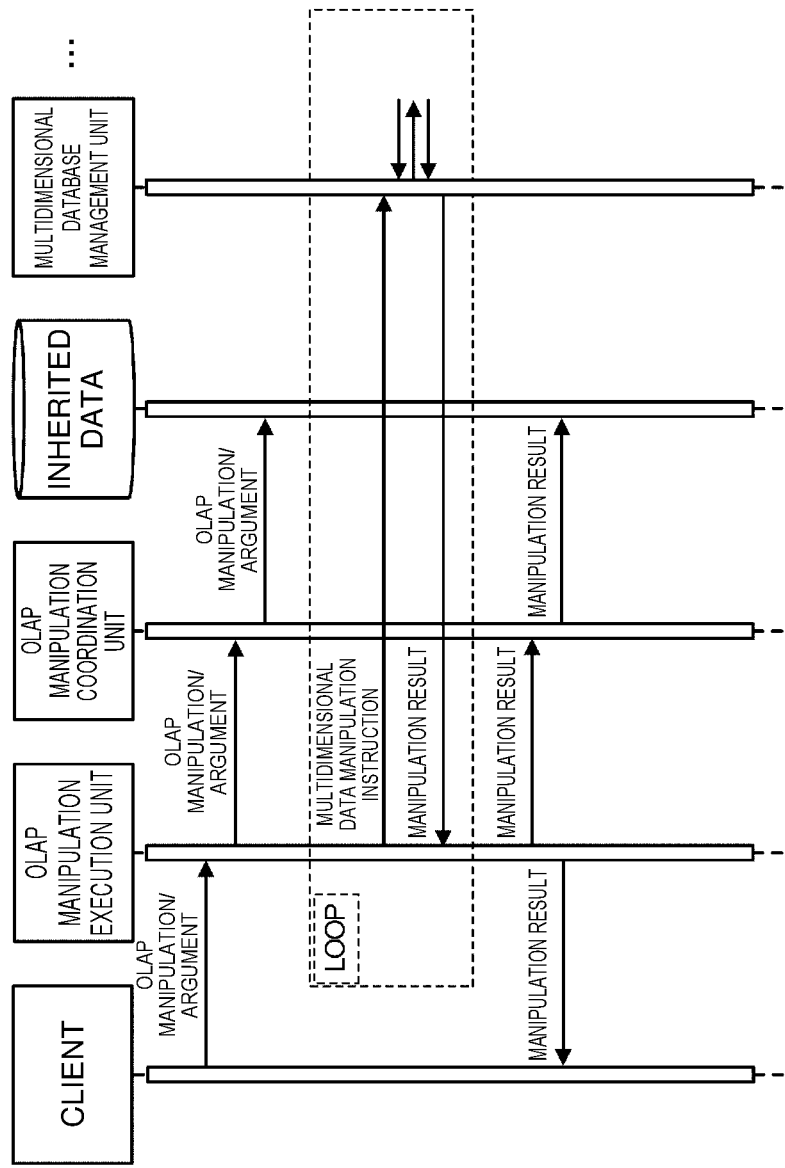

DATA ANALYTICAL PROCESSING APPARATUS, DATA ANALYTICAL PROCESSING METHOD, AND DATA ANALYTICAL PROCESSING PROGRAM

CROSS-REFERENCE TO RELATED APPLICATIONS

This application is a 371 U.S. National Phase of International Application No. PCT/JP2019/034475, filed on Sep. 2, 2019. The entire disclosure of the above application is incorporated herein by reference.

TECHNICAL FIELD

One aspect of this invention relates to a data analytical processing device, a data analytical processing method, and a data analytical processing program.

BACKGROUND ART

There is known a data analytical processing device for analyzing, by an online analytical processing (OLAP) manipulation, an event in the real world which changes in terms of time and/or space due to creation and annihilation and/or state transition by mapping data which embodies the event in the real world onto a multidimensional cube.

The data analytical processing device uses the technique as disclosed in, for example, Non-Patent Literature 1:
 (1) accumulating pieces of data in a monolithic multidimensional database without distinguishing among the pieces of data in terms of data type, property, and purpose and managing the pieces of data;
 (2) having, as data in a temporal dimension, a period of presence of an event which is based on a time system common to events;
 (3) having, as data in spatial dimensions, a position and a shape of an event which are based on a coordinate system common to events;
 (4) using a time point or a period as a non-operator and an operator as an argument to select data in the temporal dimension corresponding to the non-operator and the operator from a multidimensional cube on the basis of the time system common to events; and
 (5) using a position and a shape as a non-operator and an operator as an argument to select data in the spatial dimensions corresponding to the non-operator and the operator from the multidimensional cube on the basis of the coordinate system common to events.

The technique disclosed in Non-Patent Literature 2 further proposes (6) the process of, at the time of selection of data corresponding to a non-operator and an operator from a multidimensional cube, selecting pieces of data corresponding to a single combination of a non-operator and an operator from a plurality of multidimensional cubes and merging the selected pieces of data.

CITATION LIST

Non-Patent Literature

Non-Patent Literature 1: S. Rivest, Y. Bedard, and P. Marchand, "Toward better support for spatial decision making: Dening the characteristics of spatial on-line analytical processing (SOLAP)," Geomatica, Vol. 55, No. 4, pp. 539-555, 2001.

Non-Patent Literature 2: R. Kimball, trans. Fujimoto, Okada, Shimohira, Ito, and Obata, "beta ueahausu tsuru kitto" (data warehouse toolkit), Chs. 5 and 16, Nikkei Business Publications, Inc. (1998)

SUMMARY OF THE INVENTION

Technical Problem

In a conventional data analytical processing device, the scope of capability to analyze data is not sufficiently wide.

For example, although a conventional data analytical processing device accumulates and manages data which embodies an event in the real world, the conventional data analytical processing device does not accumulate and manage a relationship with the event that is a source of information on the data and pieces of data in a temporal dimension and spatial dimensions which embody temporal and spatial changes due to creation and annihilation and/or state transition. Thus, the conventional data analytical processing device is not capable of analyzing data with a focus on an event as a source of information on data and state transition of the event.

This invention has been made in view of the above-described circumstances, and has as its object to provide a data analytical processing device, a data analytical processing method, and a data analytical processing program capable of analyzing data with a focus on an event as a source of information on data and state transition of the event.

Means for Solving the Problem

In order to solve the above-described problem, according to a first aspect of this invention, a data analytical processing device is a data analytical processing device that analyzes, by an OLAP manipulation, an event in a real world which changes in terms of at least one of time and space due to at least one of creation and annihilation and state transition by mapping data which embodies the event onto a multidimensional cube, including a multidimensional database management unit that associates pieces of data in a temporal dimension and spatial dimensions embodying temporal and spatial changes due to at least one of the creation and annihilation and the state transition and pieces of data in intrinsic dimensions of a plurality of types dependent on subjects, and pieces of data which are identified by the pieces of data in the temporal dimension, the spatial dimensions, and the intrinsic dimensions and represent properties of the plurality of types dependent on the subjects as the data embodying the event with an identifier of the event for identification of the event as a source of information on the pieces of data, and accumulates and manages the pieces of data in multidimensional cubes which are constructed for the respective subjects, and an OLAP manipulation execution unit that executes the OLAP manipulation on the multidimensional cubes.

A second aspect of this invention is a data analytical processing method in a data analytical processing device that analyzes, by an OLAP manipulation, an event in a real world which changes in terms of at least one of time and space due to at least one of creation and annihilation and state transition by mapping data which embodies the event onto a multidimensional cube, including associating pieces of data in a temporal dimension and spatial dimensions embodying temporal and spatial changes due to at least one of the creation and annihilation and the state transition and pieces of data in intrinsic dimensions of a plurality of types dependent on subjects, and pieces of data which are identified by the pieces of data in the temporal dimension, the spatial dimensions, and the intrinsic dimensions and represent properties of the plurality of types dependent on the subjects as the data embodying the event with an identifier of the event for identification of the event as a source of information on the pieces of data, and accumulating and managing the pieces of data in multidimensional cubes which are constructed for the respective subjects in a storage device, and executing the OLAP manipulation on the multidimensional cubes.

A third aspect of this invention causes a processor of a computer to function as the data analytical processing device according to the first aspect of this invention.

Effects of the Invention

According to the aspects of this invention, it is possible to provide a data analytical processing device, a data analytical processing method, and a data analytical processing program capable of analyzing data with a focus on an event as a source of information on data and state transition of the event by accumulating and managing pieces of data in the temporal dimension and the spatial dimensions embodying temporal and spatial changes due to at least one of creation and annihilation and state transition, and accumulating and managing data which embodies an event, including the pieces of data in the temporal dimension and the spatial dimensions, in association with an identifier of the event for identification of the event as a source of information on the pieces of data.

BRIEF DESCRIPTION OF DRAWINGS

FIG. 13A is a sequence chart for explaining an example of operation in a case where the data analytical processing device according to the second embodiment does not use inherited data as an argument.

DESCRIPTION OF EMBODIMENTS

Embodiments of this invention will be described below with reference to the drawings.

First Embodiment (Configuration)

Figure 1:
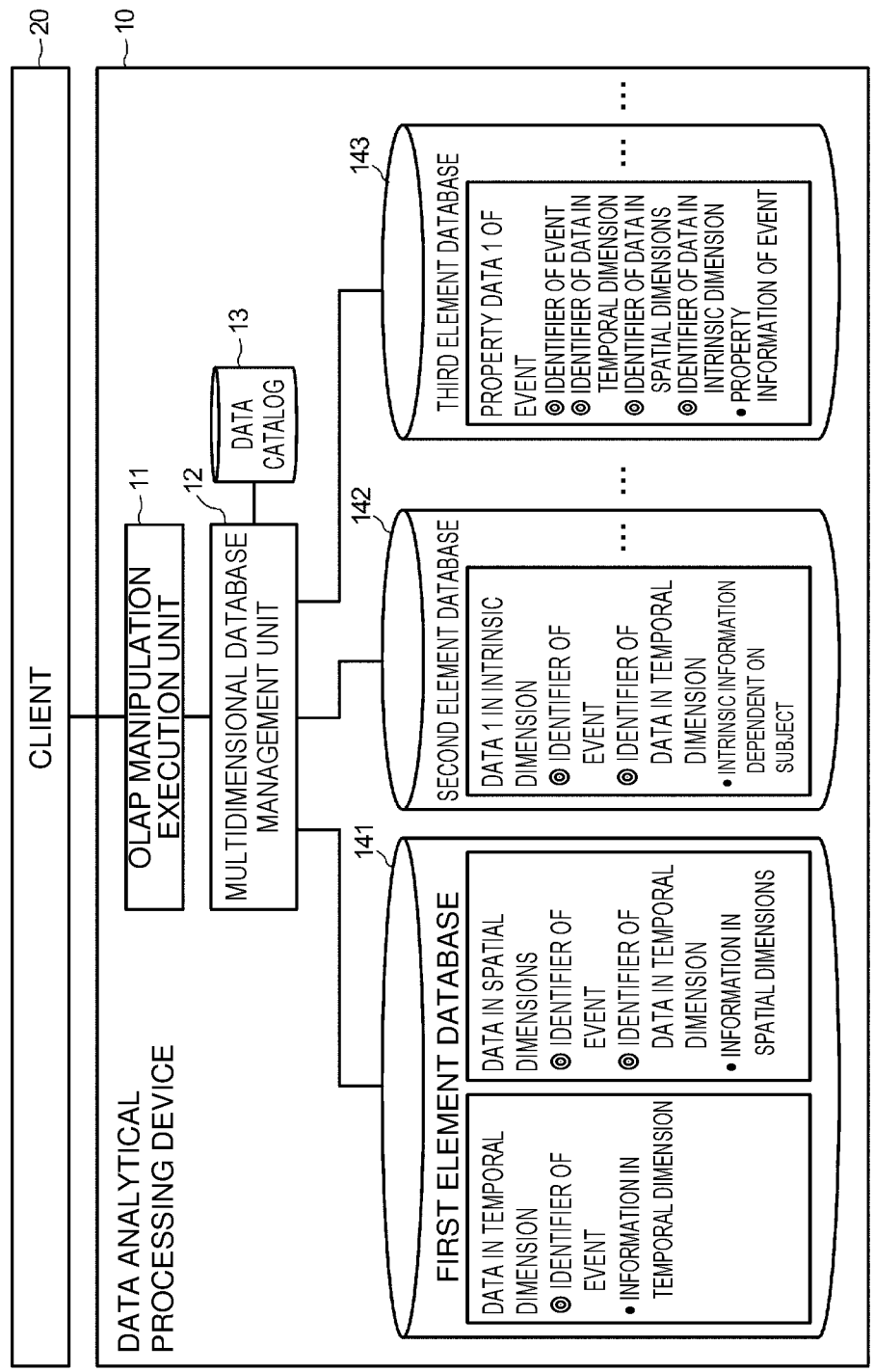
FIG. 1 is a block diagram showing an example of a configuration of a data analytical processing device according to a first embodiment of the present invention.

FIG. 1 is a block diagram showing an example of configuration of a data analytical processing device according to a first embodiment of this invention.

A data analytical processing device 10 has an OLAP manipulation execution unit 11, a multidimensional database management unit 12, a data catalog 13, and a plurality of element databases. The element databases include a first element database 141, a plurality of second element databases 142, and a plurality of third element databases 143. Note that the first to third element databases will simply be referred to as element databases 14 in the following description if distinction among the first to third element databases is unnecessary.

The first element database 141 has, for an event in the real world which changes in terms of time and/or space due to creation and annihilation and/or state transition, an accumulation of data in a temporal dimension and data in spatial dimensions which embody a temporal change and a spatial change due to creation and annihilation and/or state transition as data embodying the event.

Data in the temporal dimension includes an identifier of an event for identification of the event as a source of information on the data in the temporal dimension and information in the temporal dimension. The information in the temporal dimension is expressed using Backus-Naur Form (RFC 5234) as follows:

information-in-temporal-dimension=external-time-period*internal-time-period external-time-period=external-time-period-ID start-
time end-time internal-time-period=internal-time-period-ID start-
time end-time start-time=time end-time=time/"CONTINUE"

Figure 2:
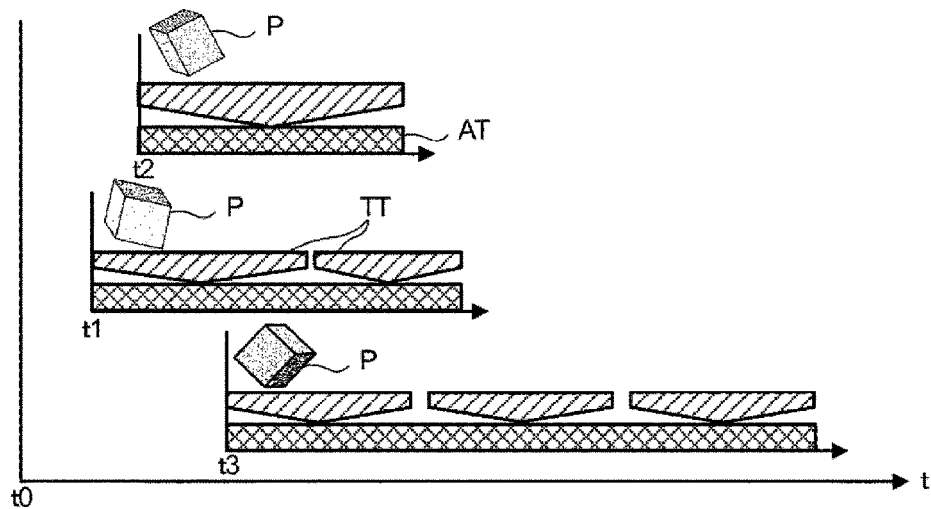
FIG. 2 is a schematic chart for explaining information in a temporal dimension.

FIG. 2 is a schematic chart for explaining information in the temporal dimension as described above. Note that although three events are denoted by the same reference character 'P' in FIG. 2, the events are individual events.

An external time period AT is a representation of a temporal change due to creation and annihilation of an event P and represents a period of presence from creation of the event P to annihilation. The external time period AT is based on an absolute time system having a time point t0 common to all the events P as an origin.

An internal time period TT is a representation of a temporal change due to state transition of an event P and represents a period of state maintenance for transition from a given state of the event P to a different state. The internal time period TT is based on a relative time system having a start time point (e.g., t1, t2, or t3) of the external time period AT of the event P as an origin.

Figure 3:
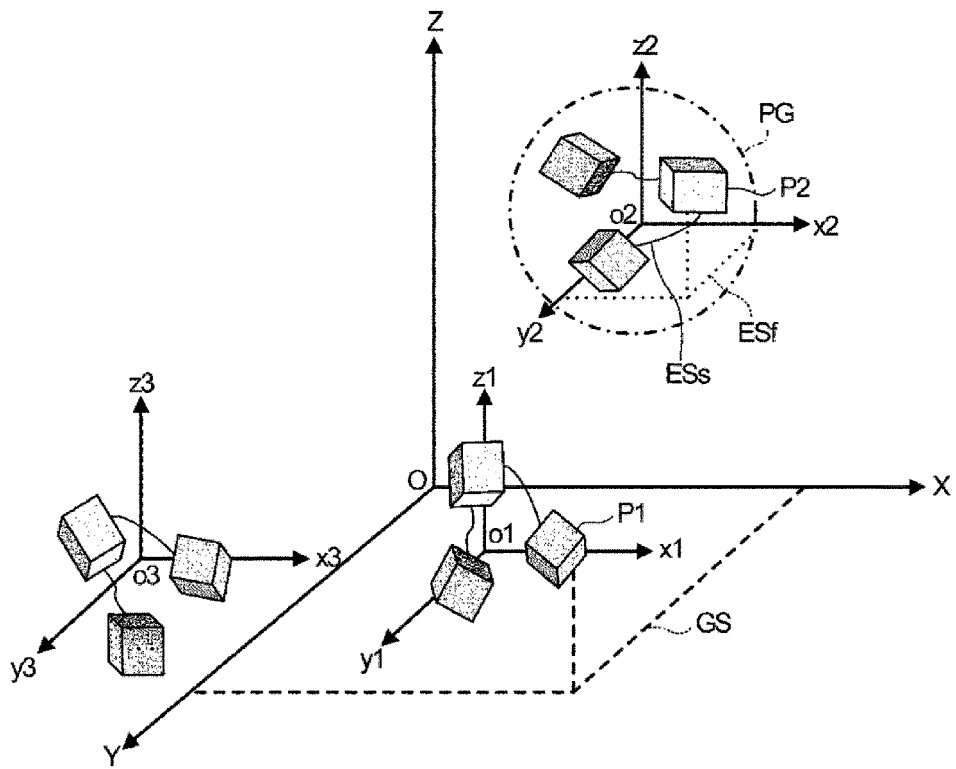
FIG. 3 is a schematic chart for explaining information in spatial dimensions.

Data in the spatial dimensions includes an identifier of an event for identification of the event as a source of information on the data in the spatial dimensions, an identifier of the temporal dimension for identification of data in the temporal dimension of the event, and information in the spatial dimensions. The information in the spatial dimensions is expressed using Backus-Naur Form (RFC 5234) as follows:

information-in-spatial-dimension=[geometric-shape]
((geographic-space engineering-space)/geo-
graphic-space/engineering-space)

geometric-shape=point/line/plane/polygon/address-
structure geographic-space=geometric-shape-barycentric-posi-
tion engineering-space=[geometric-shape-barycenter]
structure structure=inter-event-relationship event-identifier FIG. 3 is a schematic chart for explaining information in the spatial dimensions as described above.

A geographic space GS (only a geographic space GS for an event P1 is shown in FIG. 3 for simplicity) is a representation of a spatial change due to creation and annihilation of an event P and represents a shape and a position of the event P. The geographic space GS is an absolute space based on a global coordinate system (x,y,z) having a single position common to all events P as an origin O.

An engineering space is a representation of a spatial change due to state transition of an event P. The engineering space is a relative space based on a local coordinate system (x2,y2,z2) having, as an origin (o2), a single position common to an event set PG having the event P (an event P2 is shown as a representative in FIG. 3). The engineering space includes an engineering space ESf representing a geometric shape and a position of the event P in the event set PG and an engineering space ESs representing a structure which is a relationship among the events P in the event set PG.

The plurality of second element databases 142 are provided for a plurality of types dependent on subjects, respectively, and each have an accumulation of a plurality of pieces of data in an intrinsic dimension. A plurality of pieces of data in intrinsic dimensions are accumulated on a subject basis. Each piece of data in the intrinsic dimension includes an identifier of an event for identification of the event as a source of information on the data in the intrinsic dimension, an identifier of the temporal dimension for identification of data in the temporal dimension of the event, and information in the intrinsic dimension of a type dependent on a subject.

The plurality of third element databases 143 are provided for the plurality of types dependent on the subjects, respectively, and each have an accumulation of pieces of property data of an event which are each identified by data in the temporal dimension, data in the spatial dimensions, and data in an intrinsic dimension and represent properties of the plurality of types. Pieces of property data of the event representing the properties of the plurality of types are accumulated on a subject basis. Each piece of property data of the event includes an identifier of the event for identification of the event as a source of information on the piece of property data of the event, an identifier of the temporal dimension for identification of data in the temporal dimension of the event, an identifier of the spatial dimensions for identification of data in the spatial dimensions of the event, an identifier of data in an intrinsic dimension for identification of the data in the intrinsic dimension of the event, and property information of the event which represents the properties of the plurality of types dependent on the subjects.

Note that it does not matter how data is registered in the element database 14 in the present invention. Any technique may be adopted as long as pieces of data as described above are registered in the element databases 14.

The OLAP manipulation execution unit 11 receives an OLAP manipulation and an argument transmitted from a client 20 and gives an instruction for a multidimensional data manipulation to the multidimensional database management unit 12 in accordance with the OLAP manipulation and the argument. Upon receipt of a manipulation result from the multidimensional database management unit 12, the OLAP manipulation execution unit 11 transmits the manipulation result to the client 20.

In response to an instruction for a multidimensional data manipulation from the OLAP manipulation execution unit 11, the multidimensional database management unit 12 refers to the data catalog 13 and identifies the element database 14 as an object of manipulation, and manipulates the element database 14. The multidimensional database management unit 12 sends, in return, a manipulation result to the OLAP manipulation execution unit 11.

As described above, the multidimensional database management unit 12 associates pieces of data in the temporal dimension and the spatial dimensions embodying temporal and spatial changes due to creation and annihilation and/or state transition and pieces of data in intrinsic dimensions of a plurality of types dependent on subjects, and pieces of data which are identified by the pieces of data in the temporal dimension, the spatial dimensions, and the intrinsic dimensions and represent properties of the plurality of types dependent on the subjects as data embodying an event with an identifier of the event for identification of the event as a source of information on the pieces of data, and accumulates and manages the pieces of data in multidimensional cubes which are constructed for the respective subjects. That is, the multidimensional database management unit 12 dispersedly accumulates the data embodying the event in the first to third element databases 141, 142, and 143 that are a plurality of different types of databases in accordance with the type, the property, and the purpose of the data. The multidimensional database management unit 12 manages the plurality of different types of databases using the data catalog 13. With this management, the multidimensional database management unit 12 can cause the multidimensional cubes to function as a monolithic multidimensional database.

Figure 4:
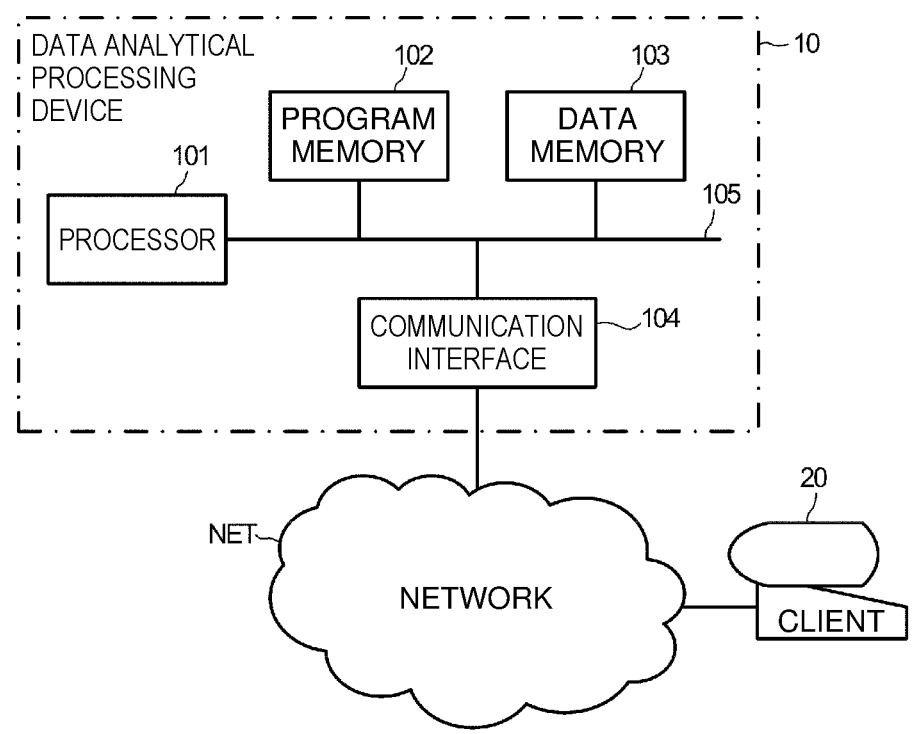
FIG. 4 is a block diagram showing an example of a configuration in a case where the data analytical processing device according to the first embodiment is implemented by a computer.

FIG. 4 is a block diagram showing, in association with the configuration shown in FIG. 1, an example of a configuration in a case where the data analytical processing device 10 according to the first embodiment is implemented by a computer.

The data analytical processing device 10 is composed of, for example, a server computer and has a hardware processor 101, such as a CPU (Central Processing Unit). A program memory 102, a data memory 103, and a communication interface 104 are connected to the hardware processor 101 via a bus 105.

The program memory 102 uses, as a storage medium, a nonvolatile memory which is writable and readable at any time, such as an HDD (Hard Disk Drive) or an SSD (Solid State Drive), and a nonvolatile memory, such as a ROM (Read Only Memory), in combination. A data analytical processing program for causing the hardware processor 101 to function as the OLAP manipulation execution unit 11 and the multidimensional database management unit 12 is stored in the program memory 102. That is, the OLAP manipulation execution unit 11 and the multidimensional database management unit 12 can be implemented as software-based processing function units by causing the hardware processor 101 to execute the data analytical processing program stored in the program memory 102.

Note that the OLAP manipulation execution unit 11 and the multidimensional database management unit 12 may be implemented in other diverse forms including an integrated circuit, such as an ASIC (Application Specific Integrated Circuit) or an FPGA (field-programmable gate array), instead of or in addition to the hardware processor 101.

The data memory 103 is a storage which uses, as a storage medium, a nonvolatile memory which is writable and readable at any time, such as an HDD or an SSD, and a volatile memory, such as a RAM (Random Access Memory), in combination and is used to store pieces of data which are acquired and created during the course of performing various types of processes. A storage region of the data memory 103 can include the data catalog 13 and the element databases 14.

The communication interface 104 includes a communication device for connecting to a network NET, such as a LAN (Local Area Network) or the Internet. With the communication interface 104, the hardware processor 101 is capable of receiving an OLAP manipulation and an argument transmitted from the client 20 and transmitting a manipulation result to the client 20 via the network NET.

Note that the data analytical processing program may not be stored in advance in the program memory 102. The data analytical processing program can be provided to the data analytical processing device 10 in a state of being recorded on a non-transitory computer-readable medium or via a network. The data analytical processing program thus provided can be stored in the program memory 102. Alternatively, the provided data analytical processing program is stored in the data memory 103 as the storage and is executed by the hardware processor 101 on an as-needed basis, which allows the hardware processor 101 to function as the OLAP manipulation execution unit 11 and the multidimensional database management unit 12.

(Operation)

Processing operation of the data analytical processing device 10 configured in the above-described manner will be described.

Figure 5:
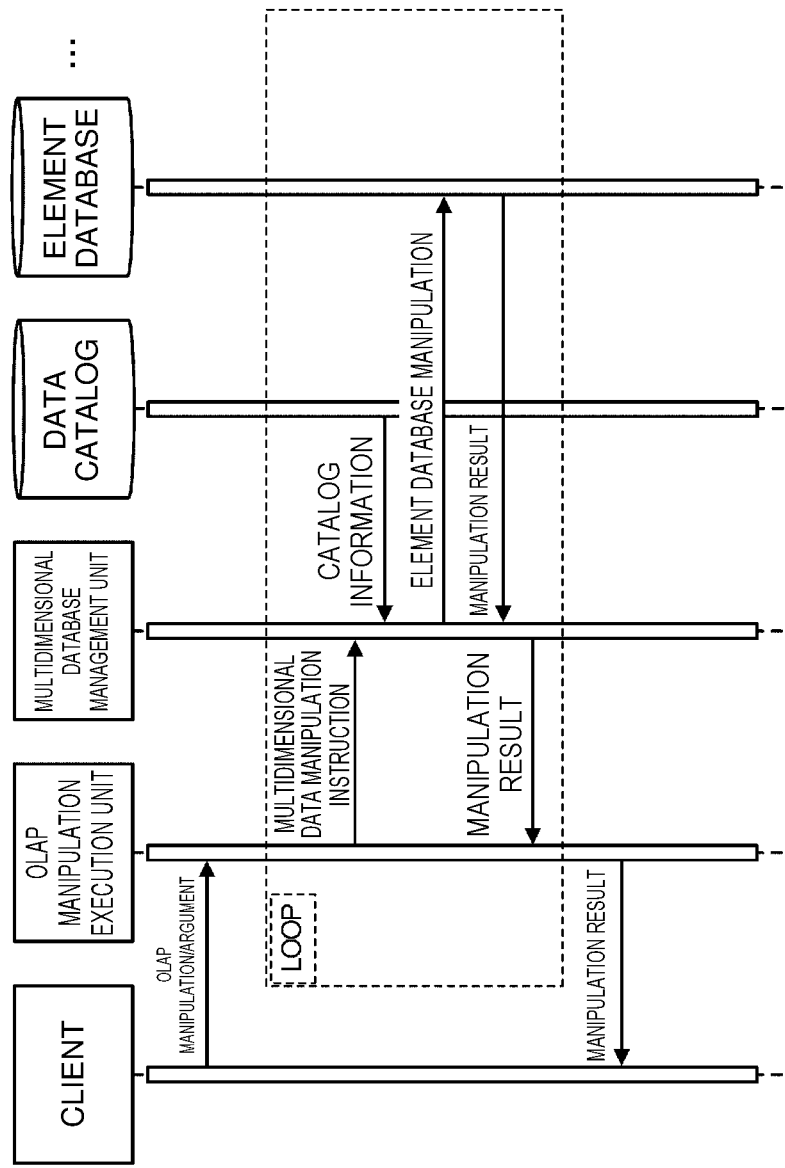
FIG. 5 is a sequence chart for explaining an example of operation of the data analytical processing device according to the first embodiment.

First, an overview of the operation of the data analytical processing device 10 will be described. FIG. 5 is a sequence chart for explaining an example of the operation of the data analytical processing device 10 according to the first embodiment.

When the OLAP manipulation execution unit 11 receives an OLAP manipulation and an argument from the client 20, the OLAP manipulation execution unit 11 gives an instruction for a multidimensional data manipulation based on the OLAP manipulation and the argument to the multidimensional database management unit 12.

In response to the instruction for the multidimensional data manipulation, the multidimensional database management unit 12 refers to the data catalog 13 and identifies the element database 14 as an object of manipulation, and manipulates the element database 14. The multidimensional database management unit 12 sends, in return, a manipulation result of the multidimensional data manipulation to the OLAP manipulation execution unit 11.

As indicated by a dashed frame "LOOP" in FIG. 5, the OLAP manipulation execution unit 11 repeatedly gives an instruction to the multidimensional database management unit 12 in accordance with particulars of the received OLAP manipulation.

At the time of acquisition of a final manipulation result corresponding to the particulars of the OLAP manipulation, the OLAP manipulation execution unit 11 sends, in return, the manipulation result of the OLAP manipulation to the client 20.

Figure 6:
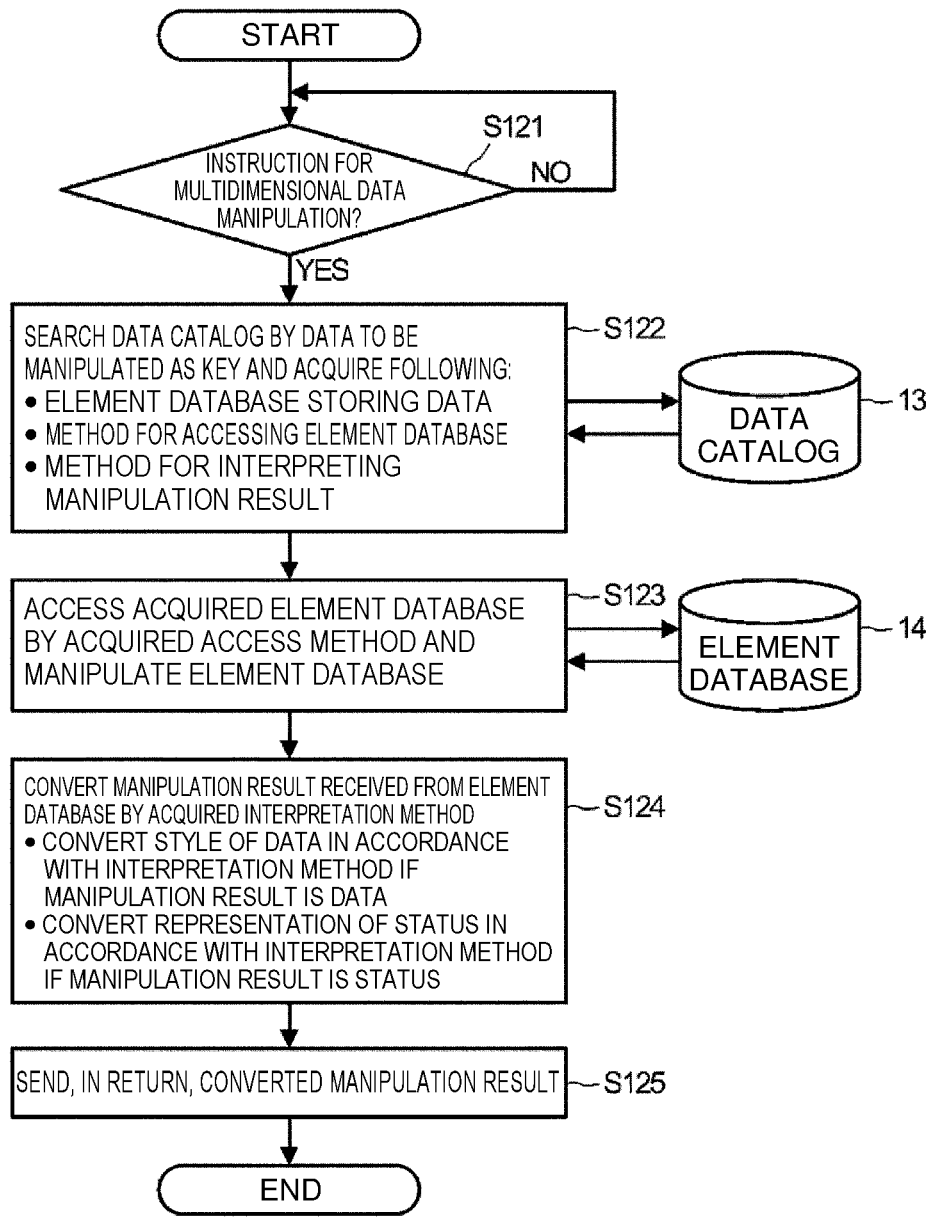
FIG. 6 is a flowchart for explaining an example of operation of a multidimensional database management unit in FIG. 1 of causing a plurality of different types of databases to function as a monolithic multidimensional database.

Details of operation of the multidimensional database management unit 12 will be described. FIG. 6 is a flowchart for explaining an example of an operation of the multidimensional database management unit 12 of causing a plurality of different types of databases to function as a monolithic multidimensional database.

The multidimensional database management unit 12 is waiting for an instruction for a multidimensional data manipulation to be received from the OLAP manipulation execution unit 11 (step S121). Upon receipt of such an instruction, the multidimensional database management unit 12 searches the data catalog 13 by data to be manipulated as a key and acquires the element database 14 storing the data to be manipulated, a method for accessing the element database 14, and a method for interpreting a manipulation result (step S122).

The multidimensional database management unit 12 accesses the acquired element database 14 by the acquired access method and manipulates the element database 14 (step S123). Upon receipt of a manipulation result from the element database 14, the multidimensional database management unit 12 converts the manipulation result by the acquired interpretation method (step S124). For example, if the manipulation result is data, the multidimensional database management unit 12 converts a style of the data in accordance with the interpretation method. If the manipulation result is a status, the multidimensional database management unit 12 converts representation of the status in accordance with the interpretation method.

The multidimensional database management unit 12 sends, in return, the converted manipulation result to the OLAP manipulation execution unit 11 (step S125).

Figure 7:
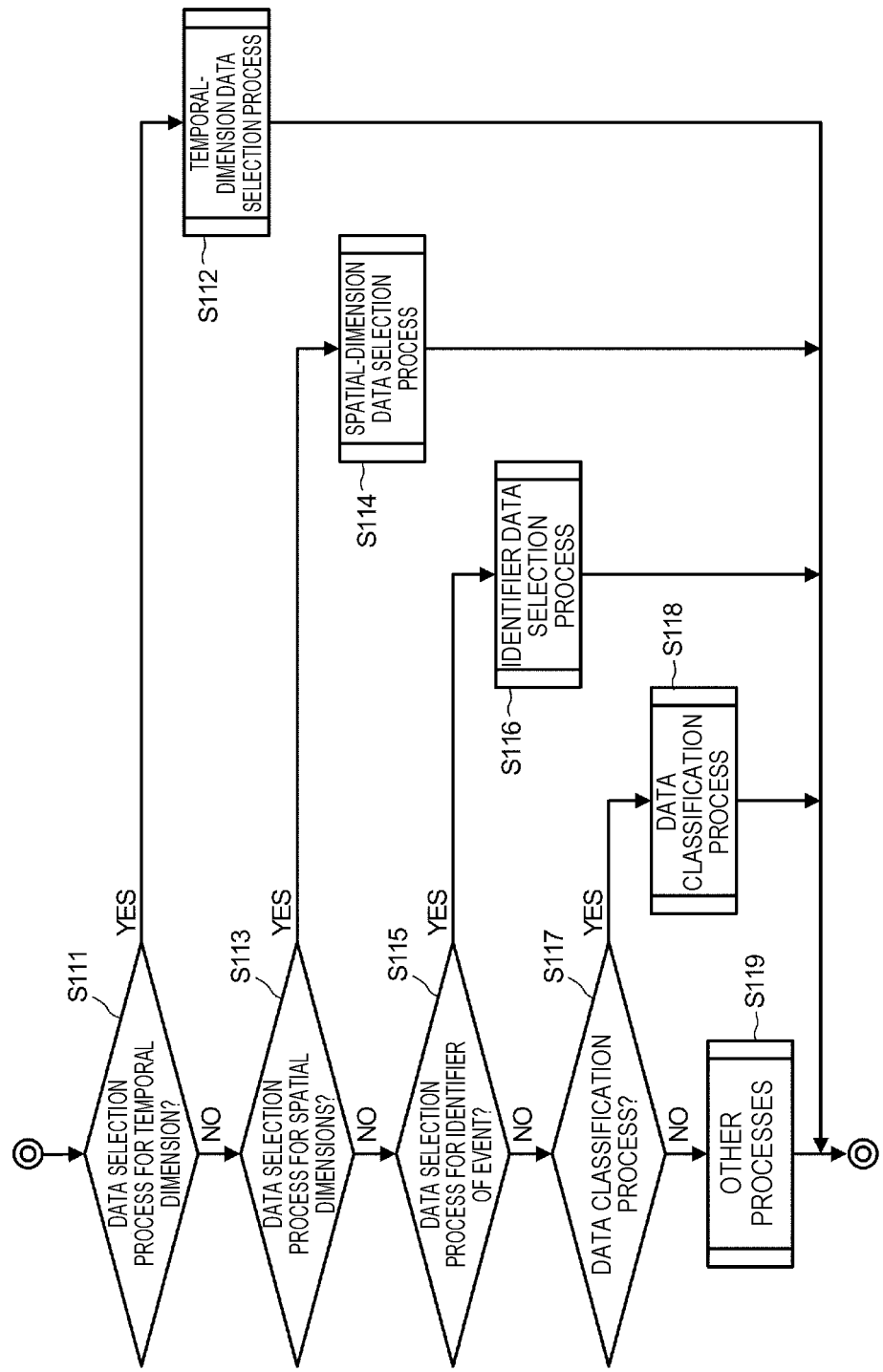
FIG. 7 is a flowchart for explaining an example of operation in a case where an OLAP manipulation execution unit in FIG. 1 executes an OLAP manipulation on a multidimensional cube.

Details of operation of the OLAP manipulation execution unit 11 will be described. FIG. 7 is a flowchart for explaining an example of operation in a case where the OLAP manipulation execution unit executes an OLAP manipulation on a multidimensional cube after reception of the OLAP manipulation and an argument from the client 20.

The OLAP manipulation execution unit 11 first determines whether a received OLAP manipulation is a data selection process for data in the temporal dimension of a multidimensional cube (step S111). If YES, the OLAP manipulation execution unit 11 executes a temporal-dimension data selection process (step S112). Details of the temporal-dimension data selection process will be described later.

If the OLAP manipulation execution unit 11 determines in step S111 above that the received OLAP manipulation is not a data selection process for data in the temporal dimension, the OLAP manipulation execution unit 11 determines whether the received OLAP manipulation is a data selection process for data in the spatial dimensions of the multidimensional cube (step S113). If YES, the OLAP manipulation execution unit 11 executes a spatial-dimension data selection process (step S114). Details of the spatial-dimension data selection process will also be described later.

If the OLAP manipulation execution unit 11 determines in step S113 above that the received OLAP manipulation is not a data selection process for data in the spatial dimensions, the OLAP manipulation execution unit 11 determines whether the received OLAP manipulation is a data selection process for an identifier of an event of the multidimensional cube (step S115). If YES, the OLAP manipulation execution unit 11 executes an identifier data selection process (step S116). Details of the identifier data selection process will also be described later.

If the OLAP manipulation execution unit 11 determines in step S115 above that the received OLAP manipulation is not a data selection process for the identifier of the event, the OLAP manipulation execution unit 11 determines whether the received OLAP manipulation is a data classification process for data of the multidimensional cube (step S117). If YES, the OLAP manipulation execution unit 11 executes a data classification process (step S118). Details of the data classification process will also be described later.

If the OLAP manipulation execution unit 11 determines in step S111 above that the received OLAP manipulation is not a data classification process, the OLAP manipulation execution unit 11 executes one of other processes which is appropriate for the received OLAP manipulation (step S119). A description of the other processes will be omitted.

Figure 8:
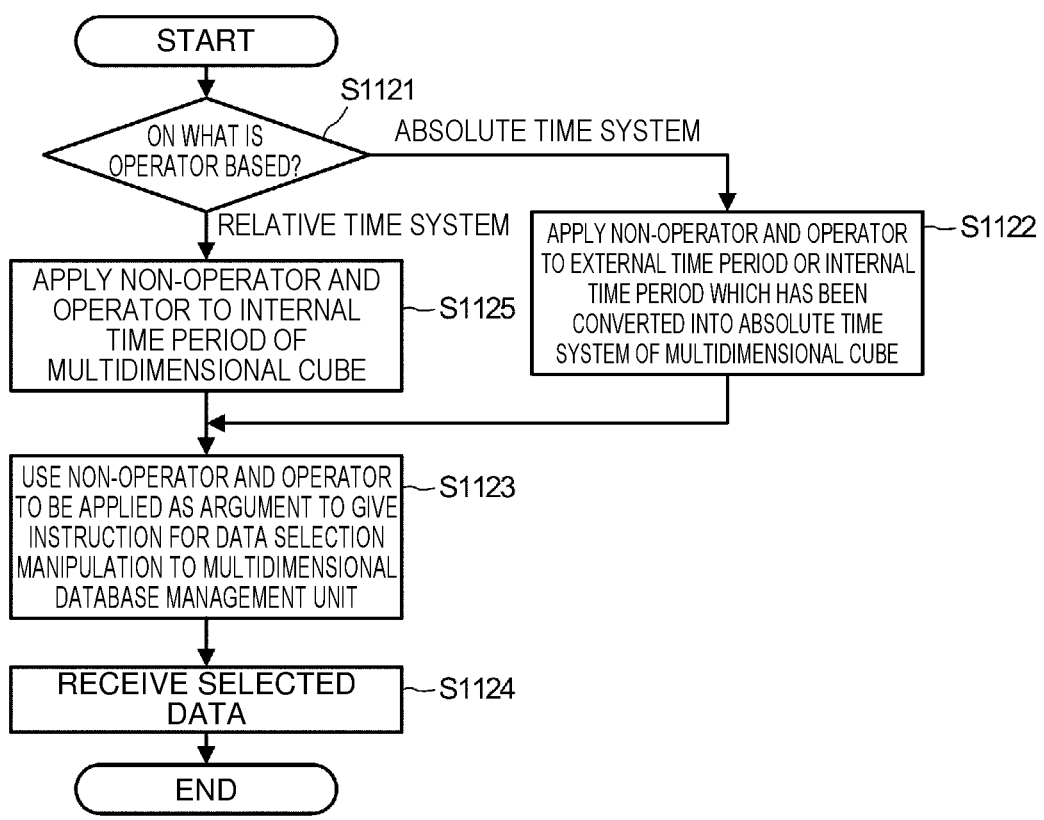
FIG. 8 is a flowchart for explaining an example of details of a temporal-dimension data selection process in FIG. 7.

FIG. 8 is a flowchart for explaining an example of the details of the temporal-dimension data selection process to be executed in step S112 above.

In an OLAP manipulation of selecting data using data in the temporal dimension of a multidimensional cube as a non-operator, an argument includes one combination of a time point or a period as a non-operator and an operator. The OLAP manipulation execution unit 11 determines whether the operator is based on an absolute time system or a relative time system (step S1121).

If the OLAP manipulation execution unit 11 determines that the operator is an operator based on an absolute time system, the OLAP manipulation execution unit 11 applies the one combination of the non-operator and the operator to an external time period or an internal time period which has been converted into the absolute time system of the multidimensional cube (step S1122). The OLAP manipulation execution unit 11 uses the non-operator and the operator to be applied as an argument to give an instruction for a data selection manipulation to the multidimensional database management unit 12 (step S1123). Note that, if the one combination of the non-operator and the operator is composed of a plurality of non-operators and a plurality of operators, the OLAP manipulation execution unit 11 combines the non-operators and operators using a logic operator and uses combined products as the argument.

The multidimensional database management unit 12 that has received the instruction for the data selection manipulation refers to the data catalog 13 and identifies the first element database 141 that is the element database 14 as an object of manipulation, as described above, and selects data from the identified first element database 141. The OLAP manipulation execution unit 11 receives the selected data that is a manipulation result sent in return from the multidimensional database management unit 12 (step S1124).

If the OLAP manipulation execution unit 11 determines in step S1121 above that the operator is an operator based on a relative time system, the OLAP manipulation execution unit 11 applies the one combination of the non-operator and the operator to the internal time period of the multidimensional cube (step S1125). After that, the OLAP manipulation execution unit 11 uses the non-operator and the operator to be applied as an argument to give an instruction for a data selection manipulation to the multidimensional database management unit 12 (step S1123). Note that, if the one combination of the non-operator and the operator is composed of a plurality of non-operators and a plurality of operators, the OLAP manipulation execution unit 11 combines the non-operators and operators using a logic operator and uses combined products as the argument. The OLAP manipulation execution unit 11 receives selected data which is a manipulation result sent in return from the multidimensional database management unit 12 that has received the instruction for the data selection manipulation (step S1124).

Figure 9:
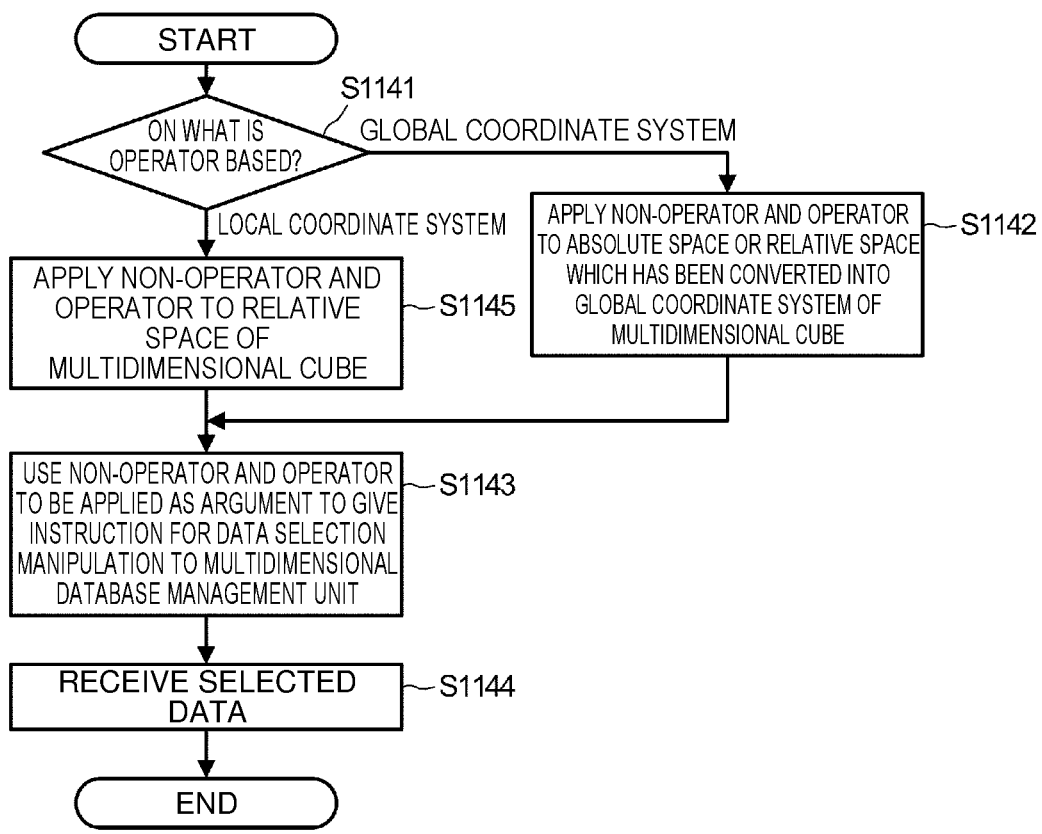
FIG. 9 is a flowchart for explaining an example of details of a spatial-dimension data selection process in FIG. 7.

FIG. 9 is a flowchart for explaining an example of the details of the spatial-dimension data selection process to be executed in step S114 above.

In an OLAP manipulation of selecting data using data in the spatial dimensions of a multidimensional cube as a non-operator, an argument includes one combination of a position and a shape as a non-operator and an operator. The OLAP manipulation execution unit 11 determines whether the operator is based on a global coordinate system or a local coordinate system (step S1141).

If the OLAP manipulation execution unit 11 determines that the operator is an operator based on a global coordinate system, the OLAP manipulation execution unit 11 applies the one combination of the non-operator and the operator to an absolute space of the multidimensional cube or a relative space which has been converted into the global coordinate system (step S1142). The OLAP manipulation execution unit 11 uses the non-operator and the operator to be applied as an argument to give an instruction for a data selection manipulation to the multidimensional database management unit 12 (step S1143). Note that, if the one combination of the non-operator and the operator is composed of a plurality of non-operators and a plurality of operators, the OLAP manipulation execution unit 11 combines the non-operators and operators using a logic operator and uses combined products as the argument.

The multidimensional database management unit 12 that has received the instruction for the data selection manipulation refers to the data catalog 13 and identifies the first element database 141 that is the element database 14 as an object of manipulation, as described above, and selects data from the identified first element database 141. The OLAP manipulation execution unit 11 receives the selected data that is a manipulation result sent in return from the multidimensional database management unit 12 (step S1144).

If the OLAP manipulation execution unit 11 determines in step S1141 above that the operator is an operator based on a local coordinate system, the OLAP manipulation execution unit 11 applies the one combination of the non-operator and the operator to the relative space of the multidimensional cube (step S1145). After that, the OLAP manipulation execution unit 11 uses the non-operator and the operator to be applied as an argument to give an instruction for a data selection manipulation to the multidimensional database management unit 12 (step S1143). Note that, if the one combination of the non-operator and the operator is composed of a plurality of non-operators and a plurality of operators, the OLAP manipulation execution unit 11 combines the non-operators and operators using a logic operator and uses combined products as the argument. The OLAP manipulation execution unit 11 receives selected data which is a manipulation result sent in return from the multidimensional database management unit 12 that has received the instruction for the data selection manipulation (step S1144).

Figure 10:
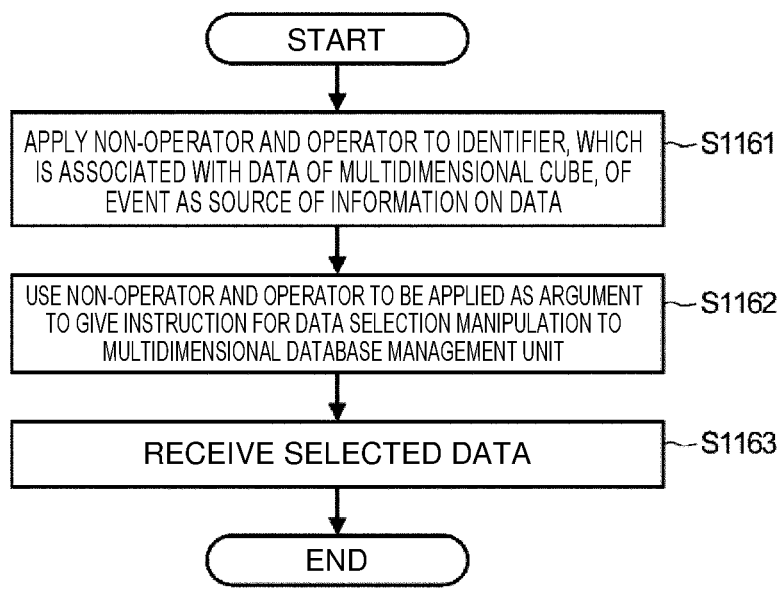
FIG. 10 is a flowchart for explaining an example of details of an identifier data selection process in FIG. 7.

FIG. 10 is a flowchart for explaining an example of the details of the identifier data selection process to be executed in step S116 above.

In an OLAP manipulation of selecting data using, as a non-operator, an identifier, which is associated with data of a multidimensional cube, of an event as a source of information on the data, an argument includes one combination of a set of identifiers as a non-operator of events as sources of pieces of information on pieces of data and an operator. The OLAP manipulation execution unit 11 applies the one combination of the non-operator and the operator to an identifier, which is associated with data of the multidimensional cube, of an event as a source of information on the data (step S1161). The OLAP manipulation execution unit 11 uses the non-operator and the operator to be applied as an argument to give an instruction for a data selection manipulation to the multidimensional database management unit 12 (step S1162). Note that, if the one combination of the non-operator and the operator is composed of a plurality of non-operators and a plurality of operators, the OLAP manipulation execution unit 11 combines the non-operators and operators using a logic operator and uses combined products as the argument.

The multidimensional database management unit 12 that has received the instruction for the data selection manipulation refers to the data catalog 13 and identifies the element database 14 as an object of manipulation, as described above, and selects data from the identified element database 14. The OLAP manipulation execution unit 11 receives the selected data that is a manipulation result sent in return from the multidimensional database management unit 12 (step S1163).

Figure 11:
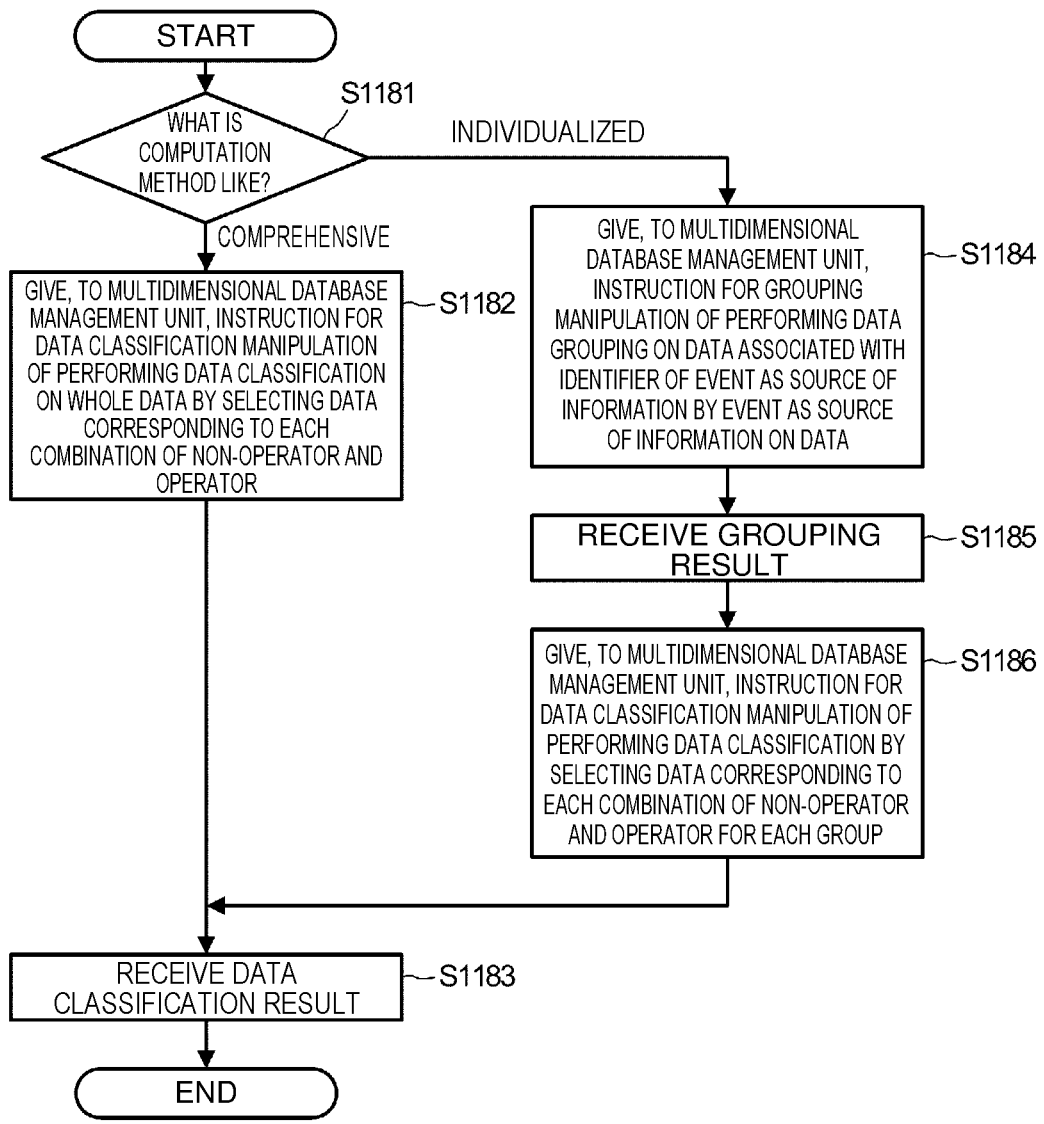
FIG. 11 is a flowchart for explaining an example of details of a data classification process in FIG. 7.

FIG. 11 is a flowchart for explaining an example of the details of the data classification process to be executed in step S118 above.

In an OLAP manipulation of classifying data using data of a multidimensional cube as a non-operator, an argument includes a plurality of combinations, each having a non-operator and an operator, and a computation method. The OLAP manipulation execution unit 11 determines whether the computation method is individualized or comprehensive (step S1181). Note that, if each combination of the non-operator and the operator is composed of a plurality of non-operators and a plurality of operators, the OLAP manipulation execution unit 11 combines the non-operators and the operators using a logic operator and uses combined products as the argument.

If the OLAP manipulation execution unit 11 determines that the computation method is comprehensive, the OLAP manipulation execution unit 11 gives, to the multidimensional database management unit 12, an instruction for a data classification manipulation of classifying whole data by selecting data corresponding to each combination of the non-operator and the operator without performing data grouping on pieces of data of the multidimensional cube corresponding to identifiers of events as sources of pieces of information on the pieces of data and pieces of data as non-operators by event as a source of information on data (step S1182).

The multidimensional database management unit 12 that has received the instruction for the data classification manipulation refers to the data catalog 13 and identifies the element database 14 as an object of manipulation, as described above, and selects data corresponding to each combination of the non-operator and the operator from the identified element database. The OLAP manipulation execution unit 11 receives a data classification result sent in return from the multidimensional database management unit 12 (step S1183).

If the OLAP manipulation execution unit 11 determines in step S1181 above that the computation method is individualized, the OLAP manipulation execution unit 11 gives, to the multidimensional database management unit 12, an instruction for a grouping manipulation of performing data grouping on the pieces of data of the multidimensional cube corresponding to the identifiers of the events as the sources of the pieces of information on the pieces of data and the pieces of data as the non-operators by event as a source of information on data (step S1184).

The multidimensional database management unit 12 that has received the instruction for the grouping manipulation refers to the data catalog 13 and identifies the element database 14 as an object of manipulation, as described above, and groups data in the identified element database. The OLAP manipulation execution unit 11 receives a grouping result which is a manipulation result sent in return from the multidimensional database management unit 12 (step S1185).

The OLAP manipulation execution unit 11 gives, to the multidimensional database management unit 12, an instruction for a data classification manipulation of performing data classification by selecting data corresponding to each combination of the non-operator and the operator for each group on the basis of the received grouping result (step S1186).

The multidimensional database management unit 12 that has received the instruction for the data classification manipulation for each group refers to the data catalog 13 and identifies the element database 14 as an object of manipulation, as described above, and selects data corresponding to each combination of the non-operator and the operator from the identified element database. The OLAP manipulation execution unit 11 receives a data classification result sent in return from the multidimensional database management unit 12 (step S1183).

(Effects)

The data analytical processing device 10 according to the first embodiment is configured to accumulate and manage data in the temporal dimension and data in the spatial dimensions which embody temporal and spatial changes due to creation and annihilation and/or state transition, accumulate and manage pieces of data embodying an event, including data in the temporal dimension and data in the spatial dimensions, in association with an identifier for identification of the event as a source of information on the pieces data, and execute an OLAP manipulation on a multidimensional cube. As described above, accumulation and management of data in the temporal dimension and data in the spatial dimensions in association with an identifier for identification of an event as a source of information on the pieces of data makes it possible to select data on the basis of an event as a source of information on the data. Thus, data can be analyzed with a focus on an event as a source of information on data and state transition of the event.

The first embodiment is configured to cause the plurality of element databases 14 to function as a monolithic multidimensional database by dispersedly accumulating data in the element databases 14 that are a plurality of different types of databases in accordance with the type, the property, and the purpose of the data and managing the element databases 14 using the data catalog 13. As described above, accumulation and management of data in accordance with the type, the property, and the purpose of the data makes it possible to turn diverse types of data into an object of analysis.

The first embodiment is configured to have, as data in the temporal dimension embodying an event which has a period of presence from a start time point to an end time point and takes at least one state during the period of presence, an external time period which represents a period of presence of an event on the basis of an absolute time system having, as an origin, a single time point common to all events including the event and at least one internal time period which each represents a period of state maintenance for transition of a given event from a given state to a different state on the basis of a relative time system having, as an origin, a start time point of the external time period of the event. The first embodiment is also configured to, at the time of using one combination of a time point or a period as a non-operator and an operator as an argument, combining a plurality of non-operators and a plurality of operators using a logic operator if the one combination of the non-operator and the operator is composed of the non-operators and the operators, and selecting data in the temporal dimension corresponding to the non-operator and the operator from a multidimensional cube, apply the non-operator and the operator to an external time period or an internal time period which has been converted into an absolute time system in the case of an operator based on the absolute time system, apply the non-operator and the operator to the internal time period in the case of an operator based on a relative time system, and select data corresponding to the non-operator and the operator. It is thus possible to hold a period of state maintenance of each state of a given event, which represents a temporal change due to state transition of an event and is based on a relative time system having a start time point of an external time period of the event as an origin, and select data on the basis of the period of state maintenance of each state of the event that represents the temporal change due to state transition of the event and the relative time system. That is, since setting a time point of occurrence of an event as an origin makes it possible to uniformly apply an arbitrary non-operator and an arbitrary operator to data regardless of in which event the data has its source of information to select data, data can be analyzed with a focus on state transition of an event.

The first embodiment is configured to have, as data in the spatial dimensions, an absolute space which represents a position and a shape of an event on the basis of a global coordinate system having a single position common to all events as an origin and a relative space which represents a position and a shape of the event in an event set having the event on the basis of a local coordinate system having, as an origin, a single position common to the event set having the event. The first embodiment is also configured to, at the time of using one combination of a position and a shape as a non-operator and an operator as an argument, combining a plurality of non-operators and a plurality of operators using a logic operator if the one combination of the non-operator and the operator is composed of the non-operators and the operators, and selecting data in the spatial dimensions corresponding to the non-operator and the operator from a multidimensional cube, apply the non-operator and the operator to an absolute space or a relative space which has been converted into a global coordinate system in the case of an operator based on the global coordinate system, apply the non-operator and the operator to a relative space in the case of an operator based on a local coordinate system, and select data corresponding to the non-operator and the operator. It is thus possible to hold a position and a shape of a given event in an event set having the event, which represent a spatial change due to state transition of an event and is based on a local coordinate system having, as an origin, a single position common to the event set having the event, and select data on the basis of the position and the shape of the event in the event set having the event that represent the spatial change due to state transition of the event and local coordinate system. That is, since setting a position and a shape at the time of occurrence of an event as an origin makes it possible to uniformly apply an arbitrary non-operator and an arbitrary operator to data regardless of in which event the data has its source of information to select data, data can be analyzed with a focus on state transition of an event.

The first embodiment is configured to, at the time of using one combination of a set of identifiers of events as a non-operator and an operator as an argument, combining a plurality of non-operators and a plurality of operators using a logic operator if the one combination of the non-operator and the operator is composed of the non-operators and the operators, and selecting data corresponding to the non-operator and the operator from a multidimensional cube, apply the non-operator and the operator to an identifier of an event associated with data and select data corresponding to the non-operator and the operator. As described above, accumulation and management of data in association with an identifier of an event as a source of information on the data makes it possible to select data on the basis of an event as a source of information on the data. Thus, data can be analyzed with a focus on an event as a source of information on data.

The first embodiment is configured to, at the time of using a plurality of combinations, each containing a non-operator and an operator, and a computation method as an argument, combining a plurality of non-operators and a plurality of operators using a logic operator if the one combination of the non-operator and the operator is composed of the non-operators and the operators, and performing data classification by selecting data corresponding to each combination of the non-operator and the operator from a multidimensional cube, classify pieces of data associated with an identifier of an event as a source of information by event as a source of information on data by classifying the pieces of data for each group after grouping the pieces of data into groups by event as a source of information on data if the computation method is individualized. The first embodiment is also configured to classify whole data by classifying the pieces of data associated with the identifier of the event as the source of information without grouping the pieces of data by event as a source of information on data if the computation method is comprehensive. As described above, accumulation and management of data in association with an identifier of an event as a source of information on the data makes it possible to select data on the basis of an event as a source of information on the data and classify data by event as a source of information on the data. Thus, data can be analyzed with a focus on an event as a source of information on data.

Second Embodiment (Configuration)

Figure 12:
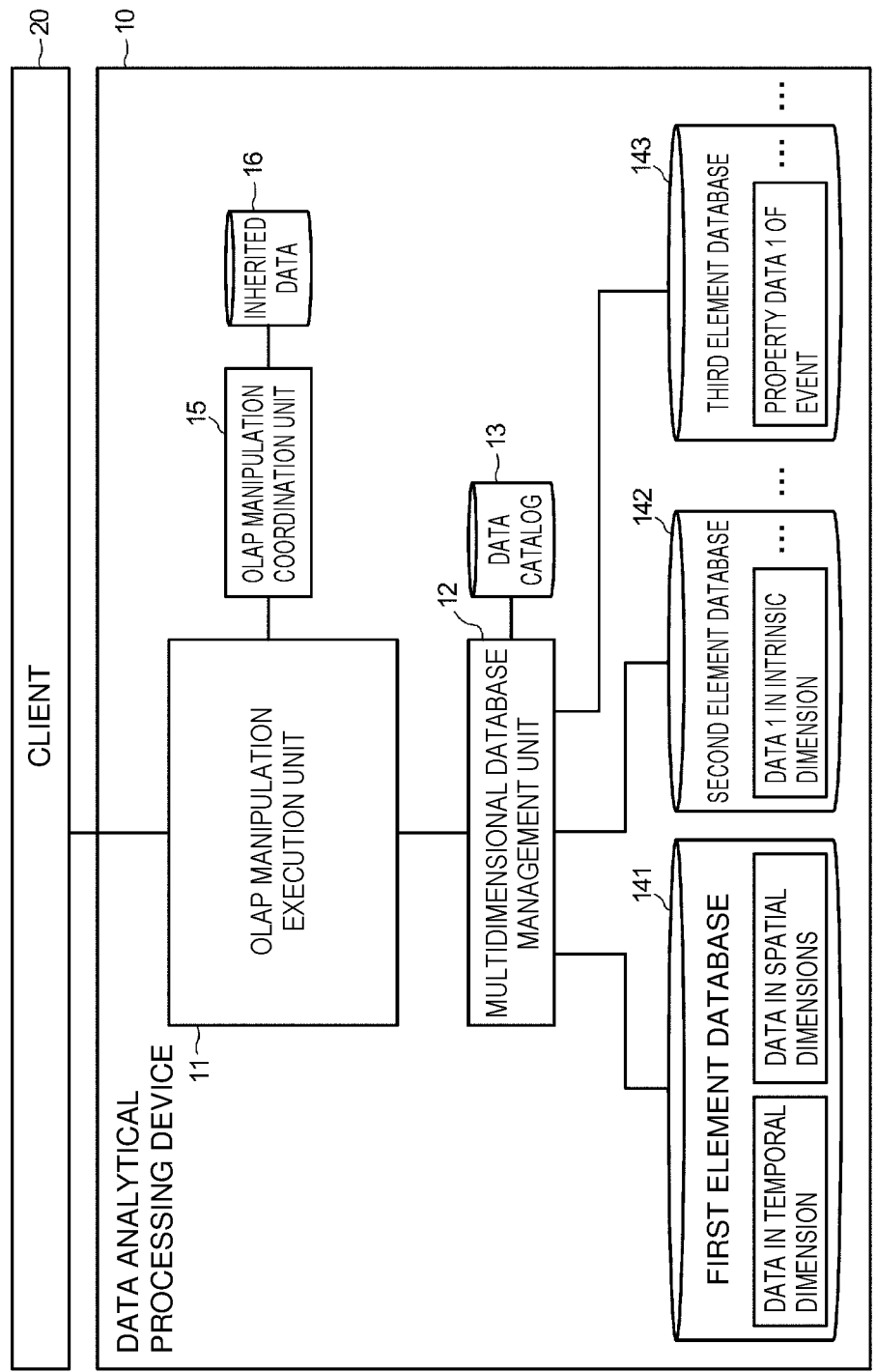
FIG. 12 is a block diagram showing an example of a configuration of a data analytical processing device according to a second embodiment of the present invention.

FIG. 12 is a block diagram showing an example of a configuration of a data analytical processing device according to a second embodiment of the present invention. Components corresponding to the first embodiment are denoted by same reference numerals as in the first embodiment, and a description thereof will be omitted.

A data analytical processing device 10 according to the second embodiment includes an OLAP manipulation coordination unit 15 and inherited data 16 in addition to the components in the first embodiment.

The OLAP manipulation coordination unit 15 records an argument or a result of an OLAP manipulation which is executed on a multidimensional cube with a given subject as inherited data 16. An OLAP manipulation execution unit 11 can use the argument or the result recorded as the inherited data 16 that is acquired from the OLAP manipulation coordination unit 15 as an argument of an OLAP manipulation to be executed for a different subject.

A configuration in a case where the data analytical processing device 10 according to the second embodiment is implemented by a computer is the same as that in the first embodiment illustrated in FIG. 4. Note that a data analytical processing program which is stored in a program memory 102 or a data memory 103 includes instruction code which causes a hardware processor 101 to function as the OLAP manipulation coordination unit 15. A storage region of the data memory 103 has inherited data 16.

(Operation)

Figure 13B:
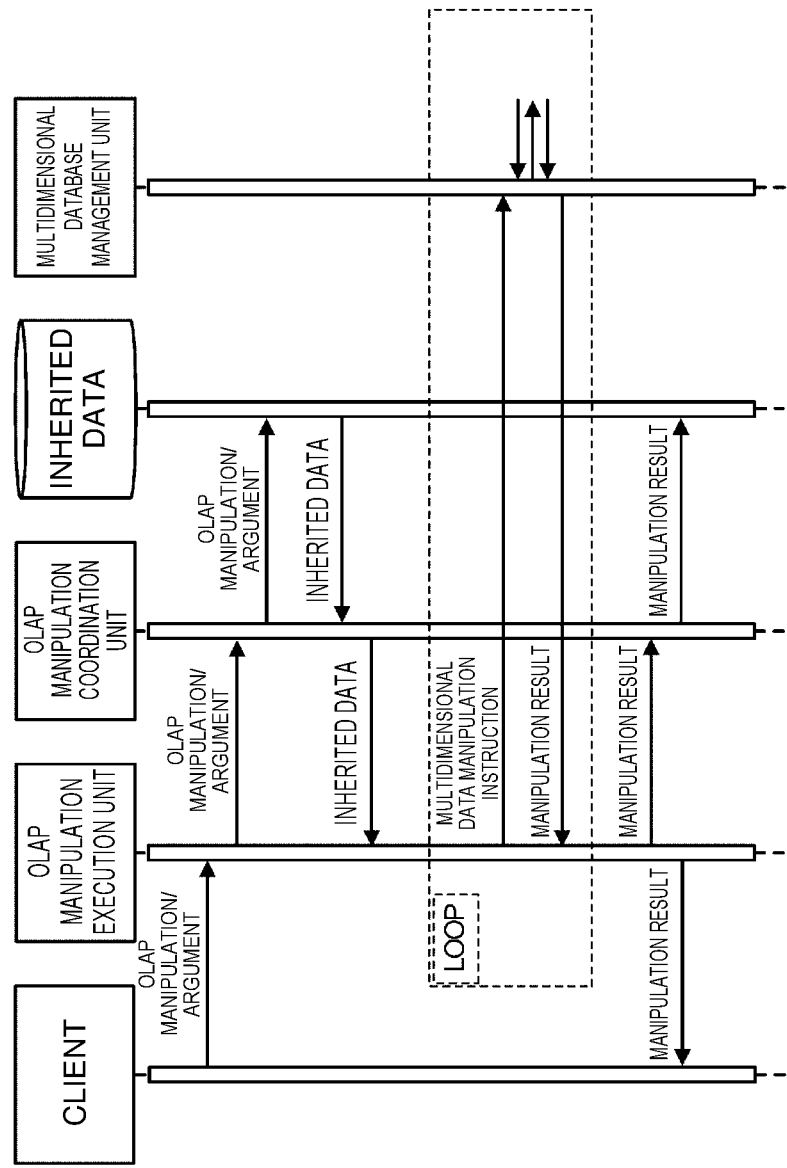
FIG. 13B is a sequence chart for explaining an example of operation in a case where the data analytical processing device according to the second embodiment uses inherited data as an argument.

FIGS. 13A and 13B are each a sequence chart for explaining an example of operation of the data analytical processing device 10 according to the second embodiment. FIG. 13A shows a case where inherited data 16 is not used as an argument of an OLAP manipulation, and FIG. 13B shows a case where inherited data 16 is used as an argument of an OLAP manipulation. Note that a data catalog 13 and an element database 14 are not shown in FIGS. 13A and 13B for simplicity.

In the case where inherited data 16 is not used as an argument of an OLAP manipulation, when the OLAP manipulation execution unit 11 receives an OLAP manipulation and an argument from a client 20, the OLAP manipulation execution unit 11 transmits the OLAP manipulation and the argument to the OLAP manipulation coordination unit 15, as shown in FIG. 13A. The OLAP manipulation coordination unit 15 associates the OLAP manipulation and the argument that are received and records the OLAP manipulation and the argument as inherited data 16.

After that, the OLAP manipulation execution unit 11 gives, to a multidimensional database management unit 12, an instruction for multidimensional data manipulation based on the OLAP manipulation and the argument received from the client 20, as described in the first embodiment.

The multidimensional database management unit 12 refers to the data catalog 13 and identifies the element database 14 as an object of manipulation, and manipulates the element database 14, in accordance with the instruction for the multidimensional data manipulation. The multidimensional database management unit 12 sends, in return, a manipulation result of the multidimensional data manipulation to the OLAP manipulation execution unit 11. The OLAP manipulation execution unit 11 repeatedly gives an instruction to the multidimensional database management unit 12 in accordance with particulars of the received OLAP manipulation.

At the time of acquisition of a final manipulation result corresponding to the particulars of the OLAP manipulation, the OLAP manipulation execution unit 11 transmits the acquired manipulation result of the OLAP manipulation to the OLAP manipulation coordination unit 15. The OLAP manipulation coordination unit 15 records the received manipulation result of the OLAP manipulation as the inherited data 16 such that the manipulation result joins with the OLAP manipulation and the argument from the client 20 that are recorded as the inherited data 16 to form a combination. As described above, a non-operator, an operator, and a computation method which are designated as an argument of an OLAP manipulation on a multidimensional cube with a given subject is recorded as inherited data 16, and dimensional data obtained as a result of the OLAP manipulation and an identifier of an event as a source of information on the data can be recorded.

After that, the OLAP manipulation execution unit 11 sends, in return, the manipulation result of the OLAP manipulation to the client 20.

As described above, even if inherited data 16 is not used, the OLAP manipulation execution unit 11 records an OLAP manipulation and an argument from the client 20 and a result of a multidimensional database manipulation based on the OLAP manipulation and the argument as inherited data 16.

The OLAP manipulation execution unit 11 can use the inherited data 16 thus recorded. That is, in the case where inherited data 16 is used as an argument of an OLAP manipulation, when the OLAP manipulation execution unit 11 receives an OLAP manipulation and an argument from the client 20, the OLAP manipulation execution unit 11 transmits the OLAP manipulation and the argument to the OLAP manipulation coordination unit 15, as shown in FIG. 13B. The OLAP manipulation coordination unit 15 associates the OLAP manipulation and the argument that are received and records the OLAP manipulation and the argument as inherited data 16.

After that, if additional use of recorded inherited data 16 as an argument is designated in the OLAP manipulation and the argument from the client 20, the OLAP manipulation execution unit 11 acquires designated inherited data 16 recorded in advance from the OLAP manipulation coordination unit 15.

The OLAP manipulation execution unit 11 gives, to the multidimensional database management unit 12, an instruction for a multidimensional data manipulation based on the OLAP manipulation and the argument received from the client 20 and an argument which is acquired from the inherited data 16. The multidimensional database management unit 12 refers to the data catalog 13 and identifies the element database 14 as an object of manipulation, and manipulates the element database 14. The multidimensional database management unit 12 sends, in return, a manipulation result of the multidimensional data manipulation to the OLAP manipulation execution unit 11. The OLAP manipulation execution unit 11 can repeat processing by further giving an instruction for a multidimensional data manipulation in accordance with particulars of the OLAP manipulation.

At the time of acquisition of a final manipulation result corresponding to the particulars of the OLAP manipulation, the OLAP manipulation execution unit 11 transmits the acquired manipulation result of the OLAP manipulation to the OLAP manipulation coordination unit 15. The OLAP manipulation coordination unit 15 records the received manipulation result of the OLAP manipulation as the inherited data 16 such that the manipulation result joins with the OLAP manipulation and the argument from the client 20 that are recorded as the inherited data 16 to form a combination.

After that, the OLAP manipulation execution unit 11 sends, in return, the manipulation result of the OLAP manipulation to the client 20.

Figure 14:
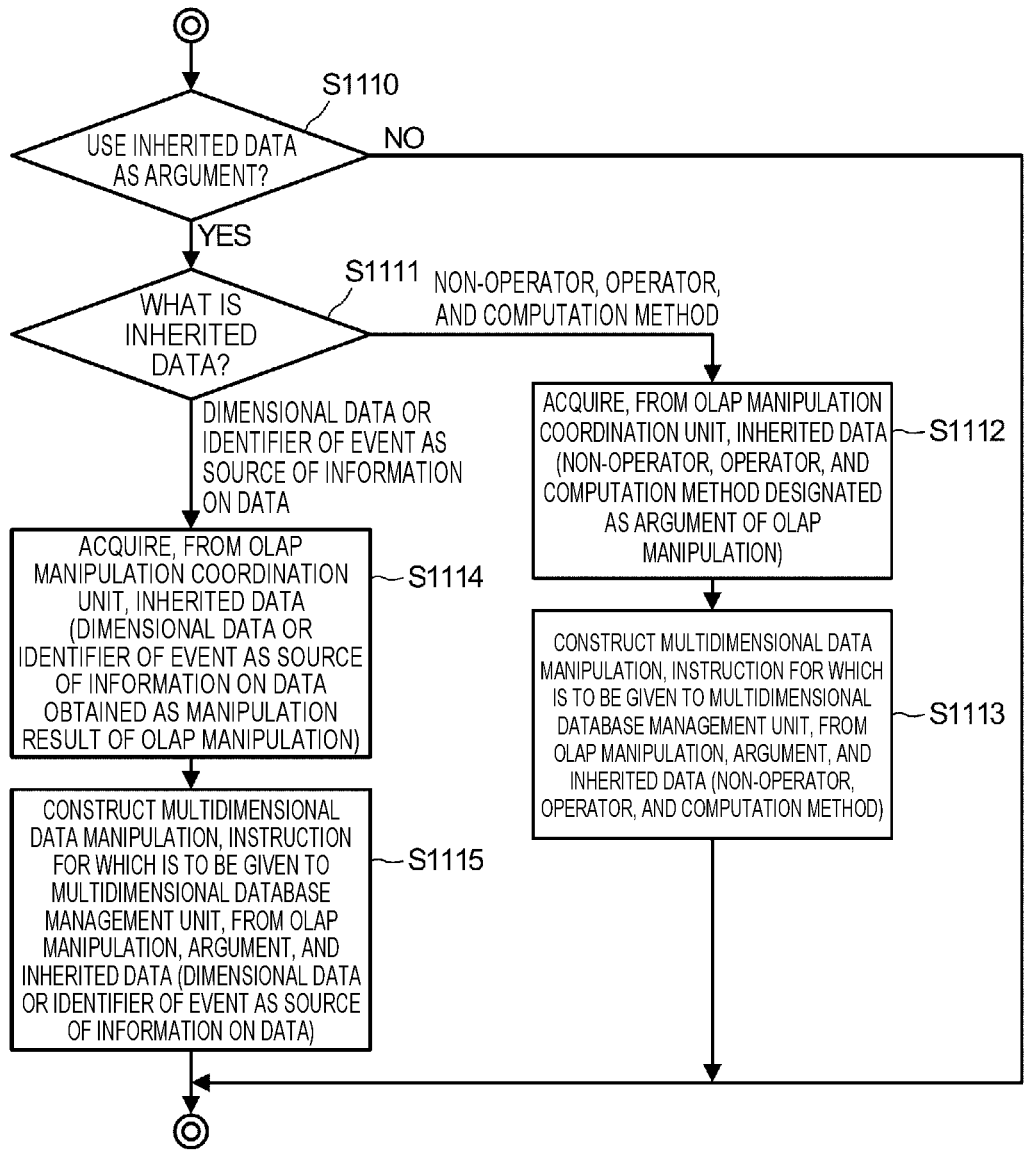
FIG. 14 is a flowchart for explaining an example of operation associated with use of inherited data of an OLAP manipulation execution unit in FIG. 13.

FIG. 14 is a flowchart for explaining an example of operation associated with use of inherited data 16 of the OLAP manipulation execution unit 11.

The OLAP manipulation execution unit 11 determines whether additional use of recorded inherited data 16 as an argument is designated in an OLAP manipulation and an argument from the client 20 (step S1110). If the OLAP manipulation execution unit 11 determines that use of inherited data 16 is not designated, i.e., in a case as shown in FIG. 13A, the OLAP manipulation execution unit 11 executes an OLAP manipulation on a multidimensional cube which complies with the OLAP manipulation and the argument from the client 20, as described in the first embodiment.

If the OLAP manipulation execution unit 11 determines in step S1110 above that additional use of inherited data 16 as an argument is designated, i.e., in a case as shown in FIG. 13B, the OLAP manipulation execution unit 11 further makes the following determination. That is, the OLAP manipulation execution unit 11 determines whether use of a non-operator, an operator, and a computation method designated as an argument of an OLAP manipulation of recorded inherited data 16 as an argument is designated or use of dimensional data obtained as a manipulation result of the OLAP manipulation or an identifier of an event as a source of information on the data as an argument is designated (step S1111).

If the OLAP manipulation execution unit 11 determines that use of the non-operator, the operator, and the computation method designated as the argument of the OLAP manipulation as an argument is designated, the OLAP manipulation execution unit 11 acquires, from the OLAP manipulation coordination unit 15, the inherited data 16, i.e., the non-operator, the operator, and the computation method designated as the argument of the OLAP manipulation (step S1112). The OLAP manipulation execution unit 11 constructs a multidimensional data manipulation, an instruction for which is to be given to the multidimensional database management unit 12, from the OLAP manipulation and the argument from the client 20 and the inherited data 16 (the non-operator, the operator, and the computation method designated as the argument of the OLAP manipulation) (step S1113). After that, an OLAP manipulation on the multidimensional cube is executed by giving an instruction for the constructed multidimensional data manipulation to the multidimensional database management unit 12.

If the OLAP manipulation execution unit 11 determines in step S1111 above that use of the dimensional data obtained as the manipulation result of the OLAP manipulation or the identifier of the event as the source of information on the data as an argument is designated, the OLAP manipulation execution unit 11 acquires, from the OLAP manipulation coordination unit 15, the inherited data 16, i.e., the dimensional data obtained as the manipulation result of the OLAP manipulation or the identifier of the event as the source of information on the data (step S1114). The OLAP manipulation execution unit 11 constructs a multidimensional data manipulation, an instruction for which is to be given to the multidimensional database management unit 12, from the OLAP manipulation and the argument from the client 20 and the inherited data 16 (the dimensional data obtained as the manipulation result of the OLAP manipulation or the identifier of the event as the source of information on the data) (step S1115). After that, an OLAP manipulation on the multidimensional cube is executed by giving an instruction for the constructed multidimensional data manipulation to the multidimensional database management unit 12.

(Effects)

The data analytical processing device 10 according to the second embodiment has the following effects in addition to those of the first embodiment.

The data analytical processing device 10 according to the second embodiment is configured to record an argument or a result of an OLAP manipulation executed on a multidimensional cube with a given subject as inherited data 16 and selectively use the argument and the result as an argument of an OLAP manipulation to be executed on a multidimensional cube with a different subject. For this reason, according to the second embodiment, it is possible to coordinate OLAP manipulations on multidimensional cubes with each other and associate and analyze the multidimensional cubes.

Here, an argument of an OLAP manipulation executed on a multidimensional cube with a given subject can include a non-operator, an operator, and a computation method which are designated as the argument of the OLAP manipulation on the multidimensional cube with the given subject. A result of the OLAP manipulation executed on the multidimensional cube with the given subject can include dimensional data obtained as a result of the OLAP manipulation on the multidimensional cube with the given subject and an identifier of an event as a source of information on the data.

Third Embodiment (Configuration)

Figure 15:
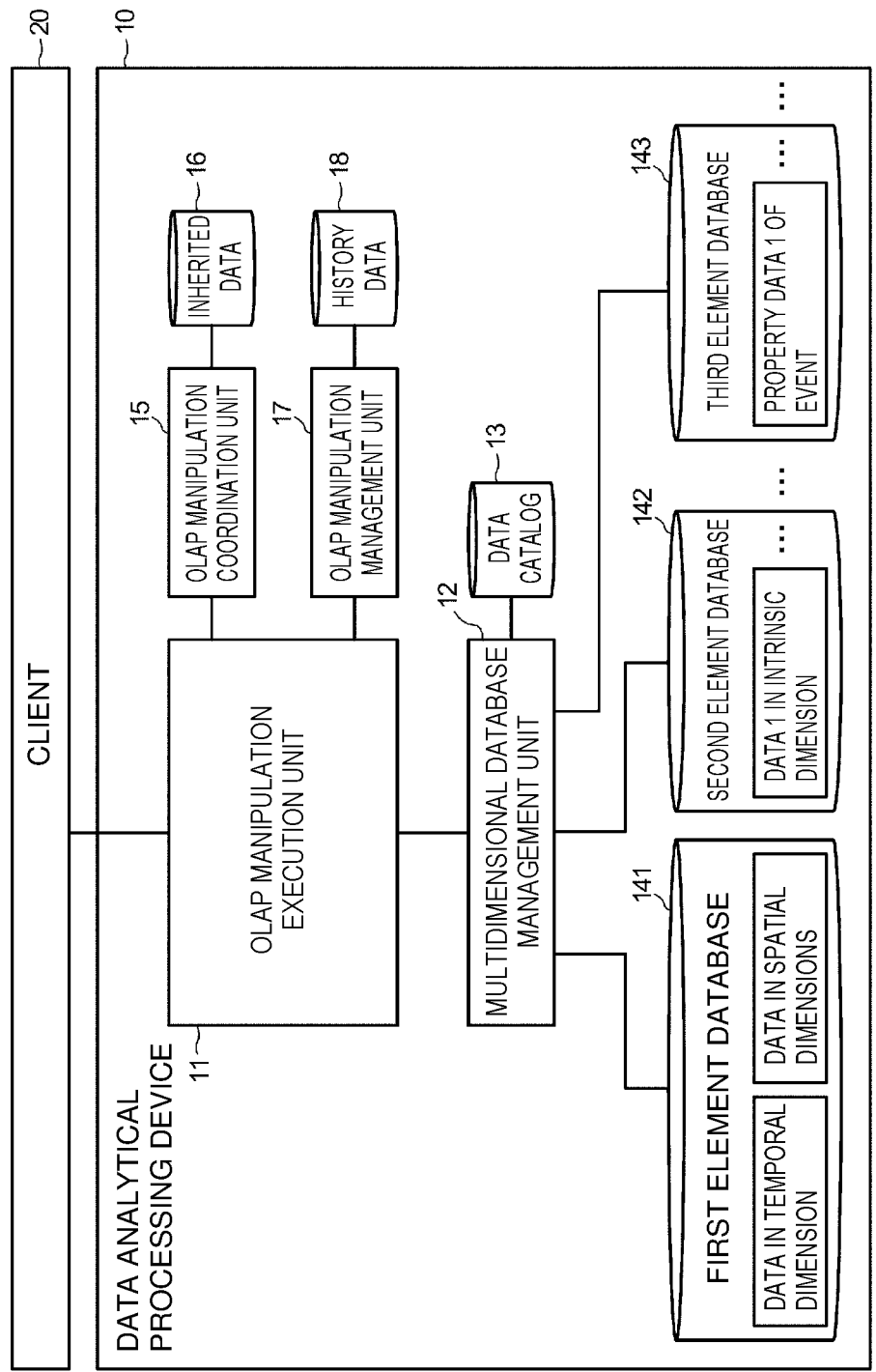
FIG. 15 is a block diagram showing an example of a configuration of a data analytical processing device according to a third embodiment of the present invention.

FIG. 15 is a block diagram showing an example of a configuration of a data analytical processing device according to a third embodiment of the present invention. Components corresponding to the second embodiment are denoted by same reference numerals as in the second embodiment, and a description thereof will be omitted.

A data analytical processing device 10 according to the third embodiment includes an OLAP manipulation management unit 17 and history data 18 in addition to the components in the second embodiment.

The OLAP manipulation management unit 17 records an OLAP manipulation on a multidimensional cube as history data 18. An OLAP manipulation execution unit 11 can use the history data 18 that is acquired from the OLAP manipulation management unit 17 as a part for arbitrarily re-executing an OLAP manipulation.

A configuration in a case where the data analytical processing device 10 according to the third embodiment is implemented by a computer is the same as that in the first embodiment illustrated in FIG. 4. Note that a data analytical processing program which is stored in a program memory 102 or a data memory 103 includes instruction code which causes a hardware processor 101 to function as the OLAP manipulation management unit 17. A storage region of the data memory 103 has history data 18.

(Operation)

Figure 16A:
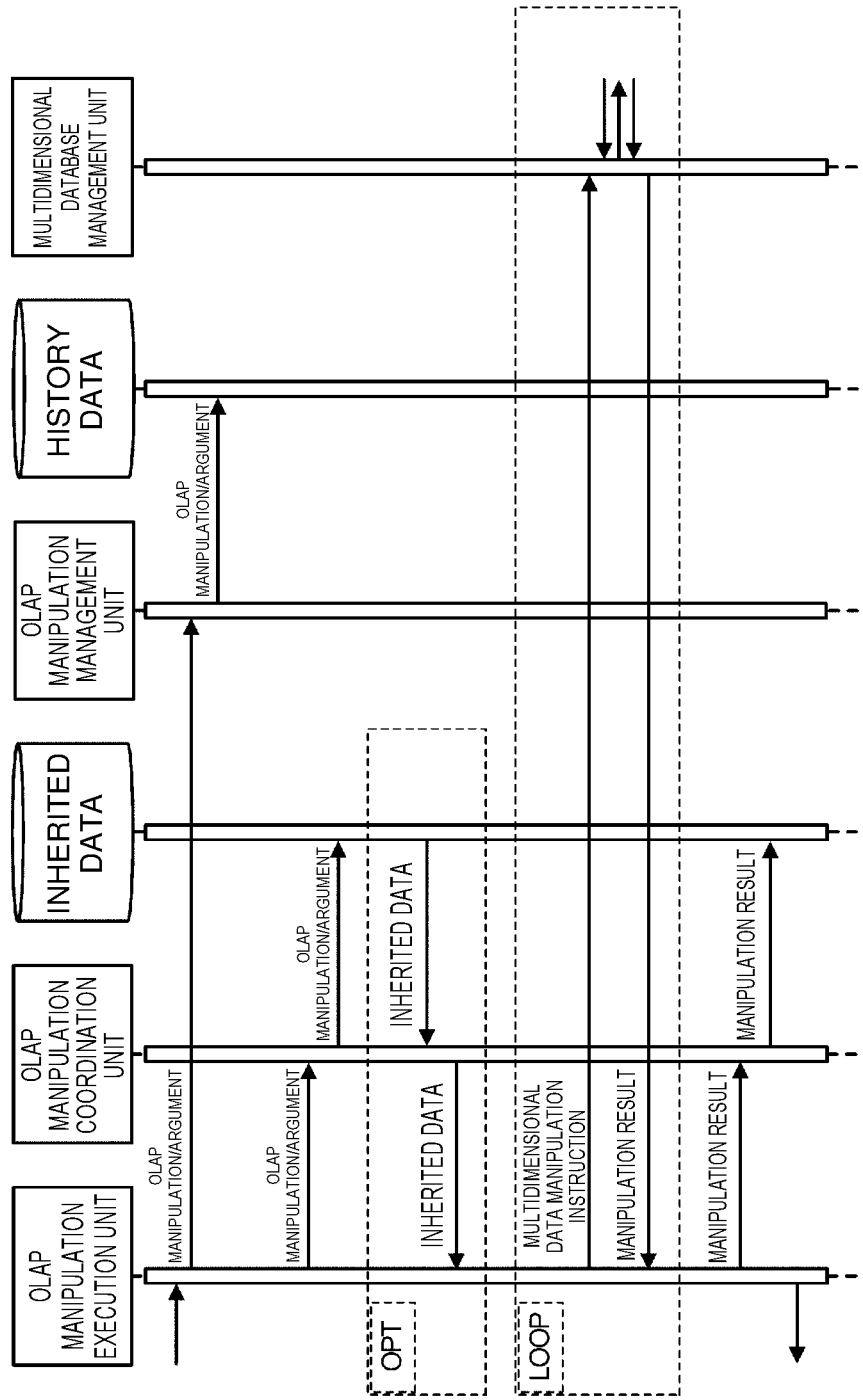
FIG. 16A is a sequence chart for explaining an example of operation in a case where the data analytical processing device according to the third embodiment does not perform re-execution of an OLAP manipulation using history data.
Figure 16B:
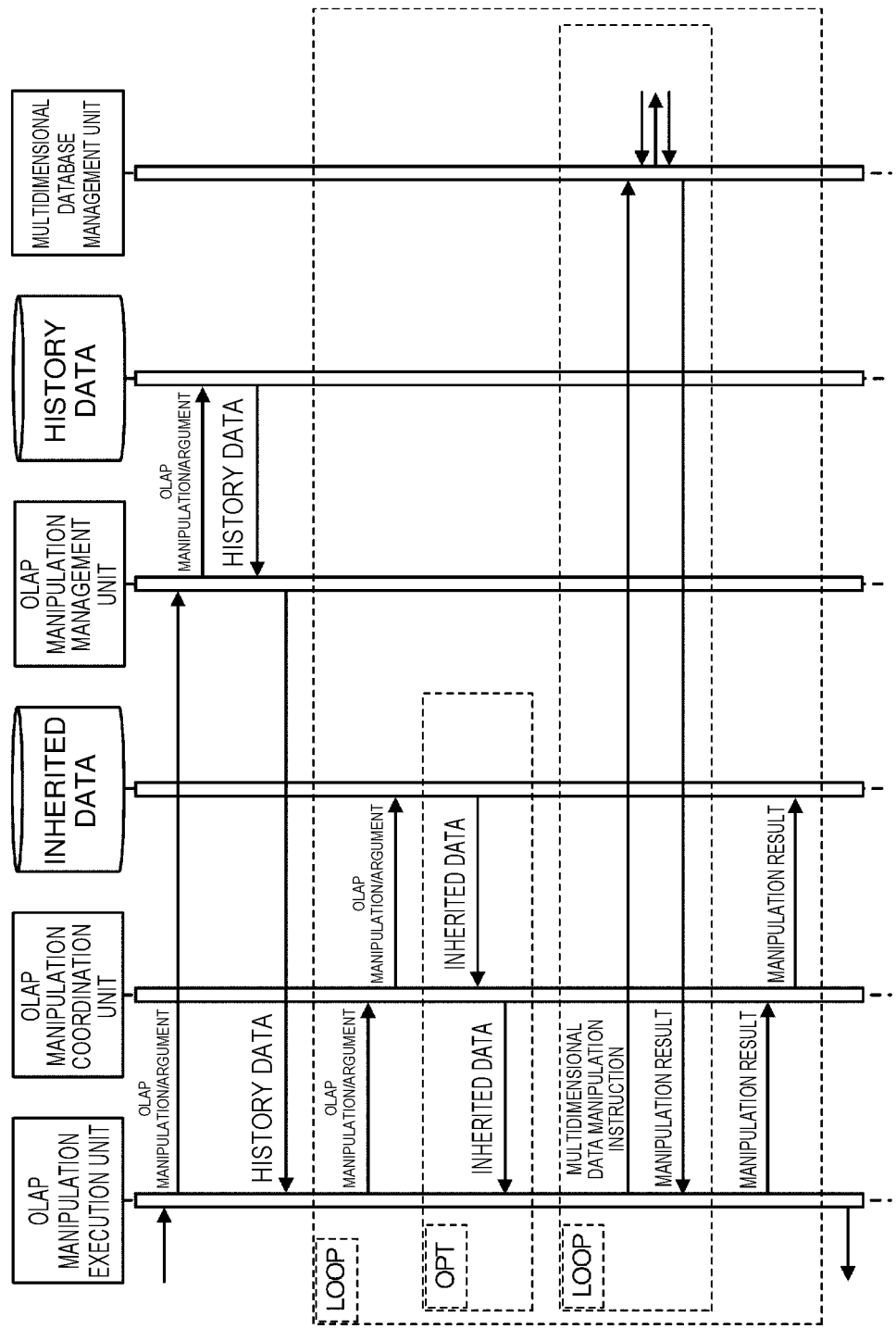
FIG. 16B is a sequence chart for explaining an example of operation in a case where the data analytical processing device according to the third embodiment performs re-execution of an OLAP manipulation using history data.

FIGS. 16A and 16B are each a sequence chart for explaining an example of operation of the data analytical processing device 10 according to the third embodiment. FIG. 16A shows a case where re-execution of an OLAP manipulation using history data 18 is not performed, and FIG. 16B shows a case where re-execution of an OLAP manipulation using history data 18 is performed. Note that a client 20, a data catalog 13, and an element database 14 are not shown in FIGS. 16A and 16B for simplicity.

In the case where re-execution of an OLAP manipulation using history data 18 is not performed, when the OLAP manipulation execution unit 11 receives an OLAP manipulation and an argument from the client 20, the OLAP manipulation execution unit 11 transmits the OLAP manipulation and the argument to the OLAP manipulation management unit 17, as shown in FIG. 16A. The OLAP manipulation management unit 17 associates the OLAP manipulation and the argument that are received and records the OLAP manipulation and the argument as history data 18.

The OLAP manipulation execution unit 11 also transmits the OLAP manipulation and the argument from the client 20 to the OLAP manipulation coordination unit 15. The OLAP manipulation coordination unit 15 associates the OLAP manipulation and the argument that are received and records the OLAP manipulation and the argument as inherited data 16.

After that, if additional use of recorded inherited data 16 as an argument is not designated in the OLAP manipulation and the argument from the client 20, the OLAP manipulation execution unit 11 gives, to a multidimensional database management unit 12, an instruction for a multidimensional data manipulation based on the OLAP manipulation and the argument received from the client 20, as described in the second embodiment. If additional use of recorded inherited data 16 as an argument is designated, the OLAP manipulation execution unit 11 acquires inherited data 16 from the OLAP manipulation coordination unit 15 and gives, to the multidimensional database management unit 12, an instruction for a multidimensional data manipulation based on the OLAP manipulation and the argument received from the client 20 and an argument which is acquired from the inherited data 16. That is, as indicated by a dashed frame "OPT" in FIG. 16A, use of inherited data 16 is optional.

The multidimensional database management unit 12 refers to the data catalog 13 and identifies the element database 14 as an object of manipulation, and manipulates the element database 14. The multidimensional database management unit 12 sends, in return, a manipulation result of the multidimensional data manipulation to the OLAP manipulation execution unit 11. The OLAP manipulation execution unit 11 can repeat processing by further giving an instruction for a multidimensional data manipulation in accordance with particulars of the OLAP manipulation.

At the time of acquisition of a final manipulation result corresponding to the particulars of the OLAP manipulation, the OLAP manipulation execution unit 11 transmits the acquired manipulation result of the OLAP manipulation to the OLAP manipulation coordination unit 15. The OLAP manipulation coordination unit 15 records the received manipulation result of the OLAP manipulation as the inherited data 16 such that the manipulation result joins with the OLAP manipulation and the argument from the client 20 that are recorded as the inherited data 16 to form a combination.

After that, the OLAP manipulation execution unit 11 sends in return the manipulation result of the OLAP manipulation to the client 20.

As described above, even if re-execution of an OLAP manipulation using history data 18 is not performed, the OLAP manipulation execution unit 11 records an OLAP manipulation and an argument from the client 20 as history data 18.

The OLAP manipulation execution unit 11 can use the history data 18 thus recorded. That is, in the case where re-execution of an OLAP manipulation using history data 18 is performed, when the OLAP manipulation execution unit 11 receives an OLAP manipulation and an argument from the client 20, the OLAP manipulation execution unit 11 transmits the OLAP manipulation and the argument to the OLAP manipulation management unit 17, as shown in FIG. 16B. The OLAP manipulation management unit 17 associates the OLAP manipulation and the argument that are received and records the OLAP manipulation and the argument as history data 18.

After that, if re-execution of an OLAP manipulation using recorded history data 18 is designated in the OLAP manipulation and the argument from the client 20, the OLAP manipulation execution unit 11 acquires designated history data 18 recorded in advance from the OLAP manipulation management unit 17.

The OLAP manipulation execution unit 11 transmits the OLAP manipulation and the argument received from the client 20 and an OLAP manipulation and an argument recorded as the acquired history data 18 to the OLAP manipulation coordination unit 15. The OLAP manipulation coordination unit 15 associates the OLAP manipulation and the argument that are received and records the OLAP manipulation and the argument as inherited data 16.

After that, if additional use of recorded inherited data 16 as an argument is not designated in the OLAP manipulation and the argument from the client 20, the OLAP manipulation execution unit 11 gives, to the multidimensional database management unit 12, an instruction for a multidimensional data manipulation based on the OLAP manipulation and the argument received from the client 20 and the acquired history data 18.

As indicated by "OPT" in FIG. 16B, if additional use of recorded inherited data 16 as an argument is designated, the OLAP manipulation execution unit 11 acquires inherited data 16 from the OLAP manipulation coordination unit 15. The OLAP manipulation execution unit 11 gives, to the multidimensional database management unit 12, an instruction for a multidimensional data manipulation based on the OLAP manipulation and the argument received from the client 20, an argument which is acquired from the inherited data 16, and the acquired history data 18.

Note that, even if additional use of recorded inherited data 16 as an argument is not designated in the OLAP manipulation and the argument from the client 20, additional use of inherited data 16 as an argument may be designated in the acquired history data 18 recorded in advance. In such a case, the OLAP manipulation execution unit 11 consequently acquires inherited data 16 and gives, to the multidimensional database management unit 12, an instruction for a multidimensional data manipulation based on the OLAP manipulation and the argument received from the client 20, an argument which is acquired from the inherited data 16, and the history data 18.

The OLAP manipulation execution unit 11 gives, to the multidimensional database management unit 12, an instruction for a multidimensional data manipulation based on the OLAP manipulation and the argument received from the client 20 and the argument acquired from the inherited data 16. The multidimensional database management unit 12 refers to the data catalog 13 and identifies the element database 14 as an object of manipulation, and manipulates the element database 14. The multidimensional database management unit 12 sends, in return, a manipulation result of the multidimensional data manipulation to the OLAP manipulation execution unit 11. The OLAP manipulation execution unit 11 can repeat processing by further giving an instruction for a multidimensional data manipulation in accordance with particulars of the OLAP manipulation.

At the time of acquisition of a final manipulation result corresponding to the particulars of the OLAP manipulation, the OLAP manipulation execution unit 11 transmits the acquired manipulation result of the OLAP manipulation to the OLAP manipulation coordination unit 15. The OLAP manipulation coordination unit 15 records the received manipulation result of the OLAP manipulation as the inherited data 16 such that the manipulation result joins with the OLAP manipulation and the argument from the client 20 that are recorded as the inherited data 16 to form a combination.

In some cases, an OLAP manipulation which is recorded as history data 18 may be such one which performs a multidimensional data manipulation a plurality of times. In this case, as indicated by a dashed frame "LOOP" in FIG. 16B, the OLAP manipulation execution unit 11 repeats operation from recording of inherited data 16.

If manipulation results of all OLAP manipulations are obtained, the OLAP manipulation execution unit 11 sends, in return, the manipulation results of the OLAP manipulations to the client 20.

Figure 17:
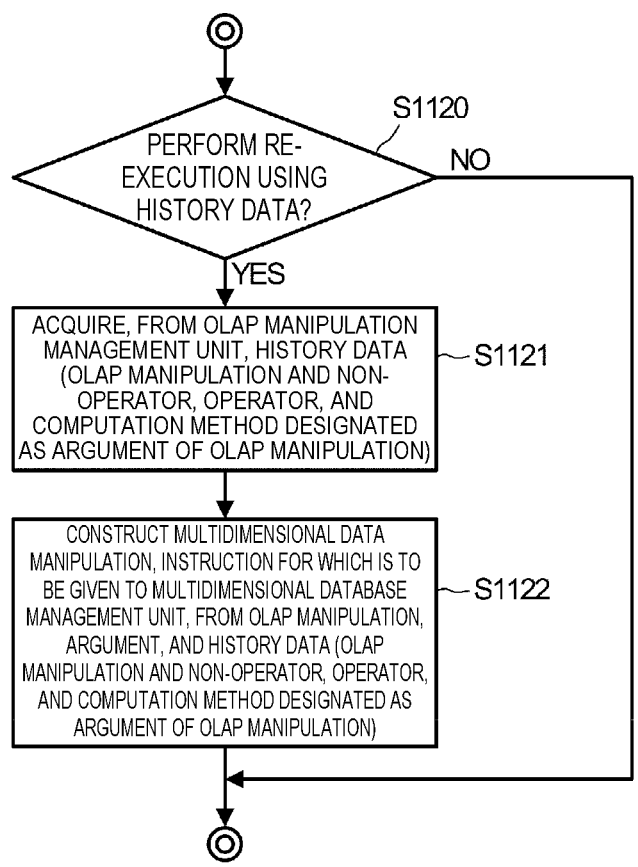
FIG. 17 is a flowchart for explaining an example of operation associated with use of history data of an OLAP manipulation execution unit in FIG. 15.

FIG. 17 is a flowchart for explaining an example of operation associated with use of history data 18 of the OLAP manipulation execution unit 11.

The OLAP manipulation execution unit 11 determines whether re-execution of an OLAP manipulation using recorded history data 18 is designated in an OLAP manipulation and an argument from the client 20 (step S1120). If the OLAP manipulation execution unit 11 determines that re-execution of an OLAP manipulation using history data 18 is not designated, i.e., in a case as shown in FIG. 16A, the OLAP manipulation execution unit 11 executes an OLAP manipulation on a multidimensional cube which complies with the OLAP manipulation and the argument from the client 20 and an argument which is recorded as inherited data 16, as described in the second embodiment.

If the OLAP manipulation execution unit 11 determines in step S1120 above that re-execution of an OLAP manipulation using inherited data 16 is designated, i.e., in a case as shown in FIG. 16B, the OLAP manipulation execution unit 11 acquires, from the OLAP manipulation management unit 17, history data 18, i.e., an OLAP manipulation and a non-operator, an operator, and a computation method which are designated as an argument of the OLAP manipulation (step S1121). The OLAP manipulation execution unit 11 constructs a multidimensional data manipulation, an instruction for which is to be given to the multidimensional database management unit 12, from the OLAP manipulation and the argument from the client 20 and the history data 18 (the OLAP manipulation and the non-operator, the operator, and the computation method designated as the argument of the OLAP manipulation) (step S1122). After that, an OLAP manipulation on the multidimensional cube is executed by giving an instruction for the constructed multidimensional data manipulation to the multidimensional database management unit 12.

(Effects)

The data analytical processing device 10 according to the third embodiment has the following effects in addition to those of the first and second embodiments.

The data analytical processing device 10 according to the third embodiment is configured to record an OLAP manipulation on a multidimensional cube as history data 18 and causes the OLAP manipulation execution unit 11 to arbitrarily perform re-execution using the recorded OLAP manipulation as a part. This makes it possible to support analysis work by restoration to a state before an analysis process and retrial (trial and error), comparison and/or evaluation, reuse, or the like. Additionally, automatic execution of the analysis process allows real-time data analysis.

Note that this invention is not limited to the embodiments as they are.

For example, the OLAP manipulation execution unit 11 collectively sends, in return, manipulation results of all OLAP manipulations to the client 20, as shown in, for example, FIG. 5. However, when each OLAP manipulation ends, the OLAP manipulation execution unit 11 may send, in return, a manipulation result to the client 20.

In the configuration of the third embodiment, the OLAP manipulation coordination unit 15 and the inherited data 16 may be omitted.

In short, this invention can be embodied in an implementation phase by deforming constituent elements without departing from the spirit. Various inventions can be formed by properly combining a plurality of constituent elements disclosed in the above-described embodiments. For example, some constituent elements may be removed from all constituent elements illustrated in the embodiments. Additionally, constituent elements spanning different embodiments may be properly combined.

REFERENCE SIGNS LIST

10 Data analytical processing device
11 OLAP manipulation execution unit
12 Multidimensional database management unit
13 Data catalog
14 Element database
15 OLAP manipulation coordination unit
16 Inherited data
17 OLAP manipulation management unit
18 History data
20 Client
101 Hardware processor
102 Program memory
103 Data memory
104 Communication interface
105 Bus
141 First element database
142 Second element database
143 Third element database
AT External time period
ESf, ESs Engineering space
GS Geographic space
NET network
P, P1, P2 Event
PG Event set
TT Internal time period

The invention claimed is:

1. A data analytical processing device that analyzes, by an online analytical processing (OLAP) manipulation, an event in a real world which changes in terms of at least one of time and space due to at least one of creation and annihilation and state transition by mapping data which embodies the event onto a multidimensional cube, comprising:
   a processor; and
   a storage medium having computer program instructions stored thereon, when executed by the processor, perform to:
   associates pieces of data in a temporal dimension and spatial dimensions embodying temporal and spatial changes due to at least one of the creation and annihilation and the state transition and pieces of data in intrinsic dimensions of a plurality of types dependent on subjects, and pieces of data which are identified by the pieces of data in the temporal dimension, the spatial dimensions, and the intrinsic dimensions and represent properties of the plurality of types dependent on the subjects as the data embodying the event with an identifier of the event for identification of the event as a source of information on the pieces of data, and accumulates and manages the pieces of data in multidimensional cubes which are constructed for the respective subjects; and
   executes the OLAP manipulation on the multidimensional cubes;
   where, as the piece of data in the temporal dimension embodying the event that has a period of presence from a start time point to an end time point and takes at least one state during the period of presence,
   an external time period represents the period of presence of the event on the basis of an absolute time system having, as an origin, a single time point common to all events including the event and
   at least one internal time period each represents a period of state maintenance for transition of the event from a given state to a different state on the basis of a relative time system having, as an origin, a start time point of the external time period.

2. The data analytical processing device according to claim 1, wherein the computer program instructions further perform to
   dispersedly accumulates the data embodying the event in a plurality of different types of databases in accordance with a type, a property, and a purpose of the data and
   causes the multidimensional cubes to function as a monolithic multidimensional database by managing the plurality of different types of databases using a data catalog.

3. The data analytical processing device according to claim 1, wherein the computer program instructions further perform to,
   at the time of using a time point or a period as a non-operator,
   applies the non-operator and an operator to the external time period or the internal time period that is converted into the absolute time system to select data corresponding to the non-operator and the operator if the operator is an operator based on the absolute time system and
   applies the non-operator and the operator to the internal time period to select data corresponding to the non-operator and the operator if the operator is an operator based on the relative time system.

4. The data analytical processing device according to claim 1, wherein, as each of the piece of data in the spatial dimensions,
   an absolute space represents a position and a shape of the event on the basis of a global coordinate system having, as an origin, a single position common to all events and
   a relative space represents a position and a shape of the event in an event set having the event on the basis of a local coordinate system having, as an origin, a single position common to the event set.

5. The data analytical processing device according to claim 4, wherein the computer program instructions further perform to,
   at the time of using a position and a shape as a non-operator,
   applies the non-operator and an operator to the absolute space or the relative space that is converted into the global coordinate system to select data corresponding to the non-operator and the operator if the operator is an operator based on the global coordinate system and
   applies the non-operator and the operator to the relative space to select data corresponding to the non-operator and the operator if the operator is an operator based on the local coordinate system.

6. The data analytical processing device according to claim 1, wherein at the time of using a set of identifiers of the event as a non-operator and an operator as an argument to execute an OLAP manipulation of selecting data corresponding to the non-operator and the operator from the multidimensional cubes, the computer program instructions further perform to applies the non-operator and the operator to the identifier of the event to select the data corresponding to the non-operator and the operator.

7. The data analytical processing device according to claim 1, wherein
   at the time of using a plurality of combinations, each having a non-operator and an operator, and a computation method as an argument to execute an OLAP manipulation of classifying the data by selecting data corresponding to each combination of the non-operator and the operator from the multidimensional cubes, the computer program instructions further perform to
   classifies the data associated with the identifier of the event by the event by classifying the data for each of groups after grouping the data into the groups by the event if the computation method is individualized and
   classifies a whole of the data by classifying the data associated with the identifier of the event without grouping the data by the event if the computation method is comprehensive.

8. The data analytical processing device according to claim 1, wherein the computer program instructions further perform to
   records an argument of the OLAP manipulation that is executed on a multidimensional cube with a given subject and uses the recorded argument as an argument of an OLAP manipulation to be executed on a different subject,
   records a non-operator, an operator, and a computation method which are designated as the argument of the OLAP manipulation on the multidimensional cube with the given subject and
   selectively uses the non-operator, the operator, and the computation method as the non-operator, an operator, and a computation method which are the argument of the OLAP manipulation on a multidimensional cube with the different subject.

9. The data analytical processing device according to claim 1, wherein the computer program instructions further perform to
records a result of the OLAP manipulation that is executed on a multidimensional cube with a given subject and uses the recorded result as an argument of an OLAP manipulation to be executed on a different subject,
records dimensional data which is obtained as the result of the OLAP manipulation on the multidimensional cube with the given subject and the identifier of the event that is associated with the data and
selectively uses the dimensional data and the identifier of the event as a non- operator which is the argument of the OLAP manipulation on a multidimensional cube with the different subject.

10. The data analytical processing device according to claim 1, wherein the computer program instructions further perform to
records the OLAP manipulation that is executed on a multidimensional cube with a given subject and causes the OLAP manipulation execution unit to arbitrarily re-execute the recorded OLAP manipulation as a part.

11. A data analytical processing method in a data analytical processing device that analyzes, by an online analytical processing (OLAP) manipulation, an event in a real world which changes in terms of at least one of time and space due to at least one of creation and annihilation and state transition by mapping data which embodies the event onto a multidimensional cube, comprising:
associating pieces of data in a temporal dimension and spatial dimensions embodying temporal and spatial changes due to at least one of the creation and annihilation and the state transition and pieces of data in intrinsic dimensions of a plurality of types dependent on subjects, and pieces of data which are identified by the pieces of data in the temporal dimension, the spatial dimensions, and the intrinsic dimensions and represent properties of the plurality of types dependent on the subjects as the data embodying the event with an identifier of the event for identification of the event as a source of information on the pieces of data, and accumulating and managing the pieces of data in multidimensional cubes which are constructed for the respective subjects in a storage device; and
executing the OLAP manipulation on the multidimensional cubes, where, as the piece of data in the temporal dimension embodying the event that has a period of presence from a start time point to an end time point and takes at least one state during the period of presence,
an external time period representing the period of presence of the event on the basis of an absolute time system having, as an origin, a single time point common to all events including the event and
at least one internal time period each representing a period of state maintenance for transition of the event from a given state to a different state on the basis of a relative time system having, as an origin, a start time point of the external time period.

12. The data analytical processing method according to claim 11 further comprises
dispersedly accumulating the data embodying the event in a plurality of different types of databases in accordance with a type, a property, and a purpose of the data and causing the multidimensional cubes to function as a monolithic multidimensional database by managing the plurality of different types of databases using a data catalog.

13. The data analytical processing method according to claim 11 further comprises at the time of using a time point or a period as a non-operator,
applying the non-operator and an operator to the external time period or the internal time period that is converted into the absolute time system to select data corresponding to the non-operator and the operator if the operator is an operator based on the absolute time system and
applying the non-operator and the operator to the internal time period to select data corresponding to the non-operator and the operator if the operator is an operator based on the relative time system.

14. The data analytical processing method according to claim 11 wherein, as each of the piece of data in the spatial dimensions,
an absolute space representing a position and a shape of the event on the basis of a global coordinate system having, as an origin, a single position common to all events and
a relative space representing a position and a shape of the event in an event set having the event on the basis of a local coordinate system having, as an origin, a single position common to the event set.

15. The data analytical processing method according to claim 14 further comprises at the time of using a position and a shape as a non-operator,
applying the non-operator and an operator to the absolute space or the relative space that is converted into the global coordinate system to select data corresponding to the non-operator and the operator if the operator is an operator based on the global coordinate system and
applying the non-operator and the operator to the relative space to select data corresponding to the non-operator and the operator if the operator is an operator based on the local coordinate system.

16. The data analytical processing method according to claim 11, further comprises at the time of using a set of identifiers of the event as a non-operator and an operator as an argument to execute an OLAP manipulation of selecting data corresponding to the non-operator and the operator from the multidimensional cubes, applying the non-operator and the operator to the identifier of the event to select the data corresponding to the non-operator and the operator.

17. The data analytical processing method according to claim 11, wherein
at the time of using a plurality of combinations, each having a non-operator and an operator, and a computation method as an argument to execute an OLAP manipulation of classifying the data by selecting data corresponding to each combination of the non-operator and the operator from the multidimensional cubes,
classifying the data associated with the identifier of the event by the event by classifying the data for each of groups after grouping the data into the groups by the event if the computation method is individualized and
classifying a whole of the data by classifying the data associated with the identifier of the event without grouping the data by the event if the computation method is comprehensive.

* * * * *